United States Patent [19]

Blaha et al.

[11] Patent Number: 4,663,822
[45] Date of Patent: May 12, 1987

[54] CUTTER/STRIPPER/COILING APPARATUS FOR THICK CABLE SEGMENTS

[75] Inventors: Gerald Blaha, Waukesha; Robert O. Dusel, Brookfield, both of Wis.

[73] Assignee: Artos Engineering Company, New Berlin, Wis.

[21] Appl. No.: 803,073

[22] Filed: Nov. 29, 1985

[51] Int. Cl.$^4$ ................. B23P 23/00; B21C 47/00
[52] U.S. Cl. ................... 29/564.4; 29/566.1; 242/80; 242/DIG. 3
[58] Field of Search ............ 29/564.3, 564.4, 564.6, 29/566.1; 242/47, 80, 83, 25 R, DIG. 3

[56] References Cited

U.S. PATENT DOCUMENTS

| | | | |
|---|---|---|---|
| 361,592 | 4/1887 | Lenox | 242/80 |
| 2,944,755 | 7/1960 | Foster | 242/80 |
| 3,895,762 | 7/1975 | Fletcher, Jr. et al. | 29/605 X |
| 3,941,329 | 3/1976 | Maillefor et al. | 242/80 |
| 4,091,695 | 5/1978 | Funcik et al. | 29/564.4 X |

*Primary Examiner*—Eugene F. Desmond
*Assistant Examiner*—Steven C. Bishop
*Attorney, Agent, or Firm*—James E. Nilles; Thomas F. Kirby

[57] ABSTRACT

Apparatus is provided for repeatedly severing cable segments of desired lengths from a continuous strand of thick multi-conductor cable for stripping desired lengths of tough outer insulation sheath from the strand and segment ends, and for coiling the stripped segments. The apparatus comprises a cutter/stripper machine, a long-strip attachment mechanism, and a coiling mechanism. The cutter/stripper machine comprises an axially retractable/extendable wire guide tube into which the cable strand is fed while the tube is extended and a movable clamp grips the lead end of the strand. A stationary clamp grips the exposed portion of the strand when the tube retracts. A cutter/stripper head mechanism between the clamps severs the strand and scores the insulation sheath. The cutter/stripper mechanism and the movable clamp move away from the stationary clamp at different rates of speed to effect stripping, open to release the stripped cable segment, and then return to their starting positions. The long-strip attachment mechanism is optionally usable to completely strip extra-long lengths of sheath from the trailing end of the segment. The coiling mechanism is optionally usable to coil the stripped segments. A control system operates the cutter/stripper machine, the long-strip attachment mechanism and coiling mechanism in synchronism and employs a programmable electronic controller responsive to sensors in the cutter/stripper machine to control electric solenoid-operated pneumatic actuators in the apparatus.

22 Claims, 24 Drawing Figures

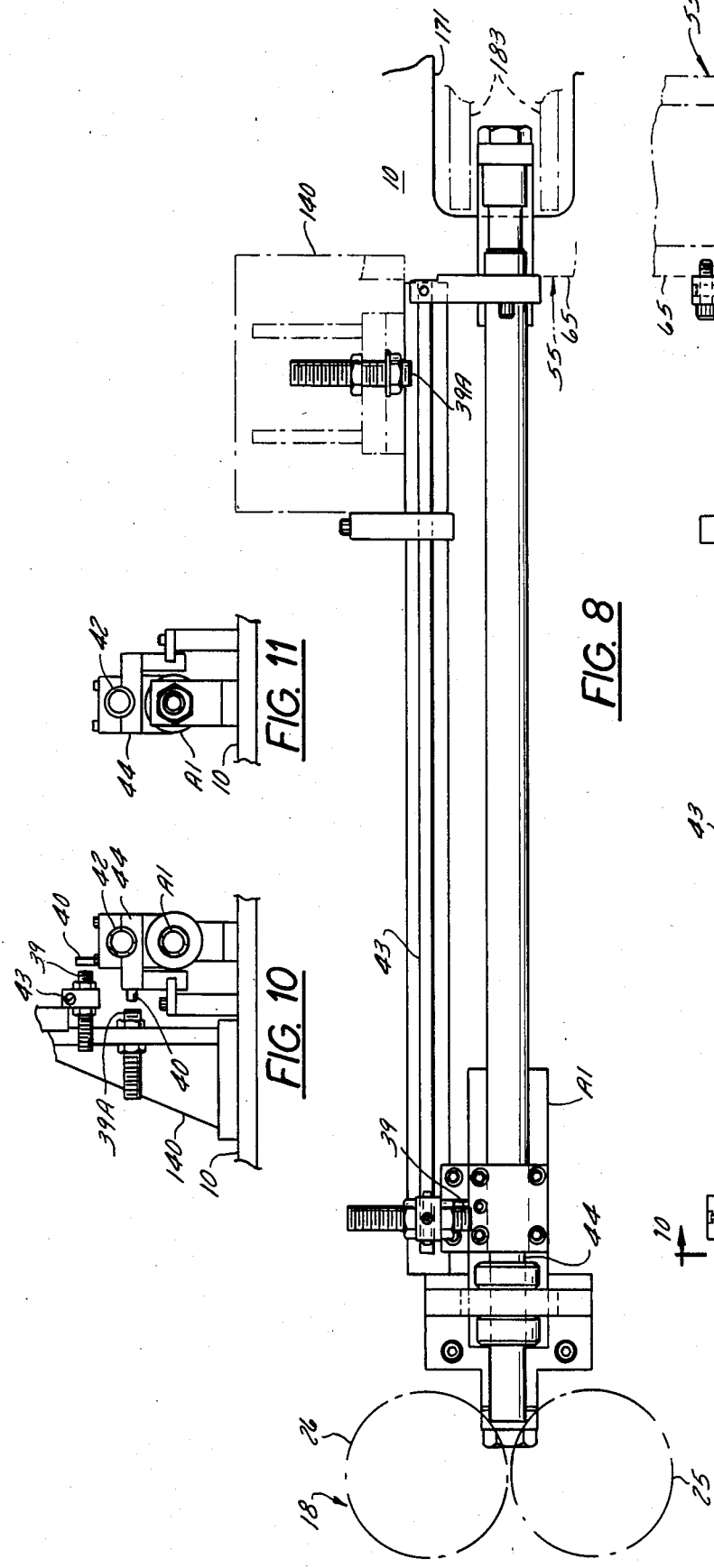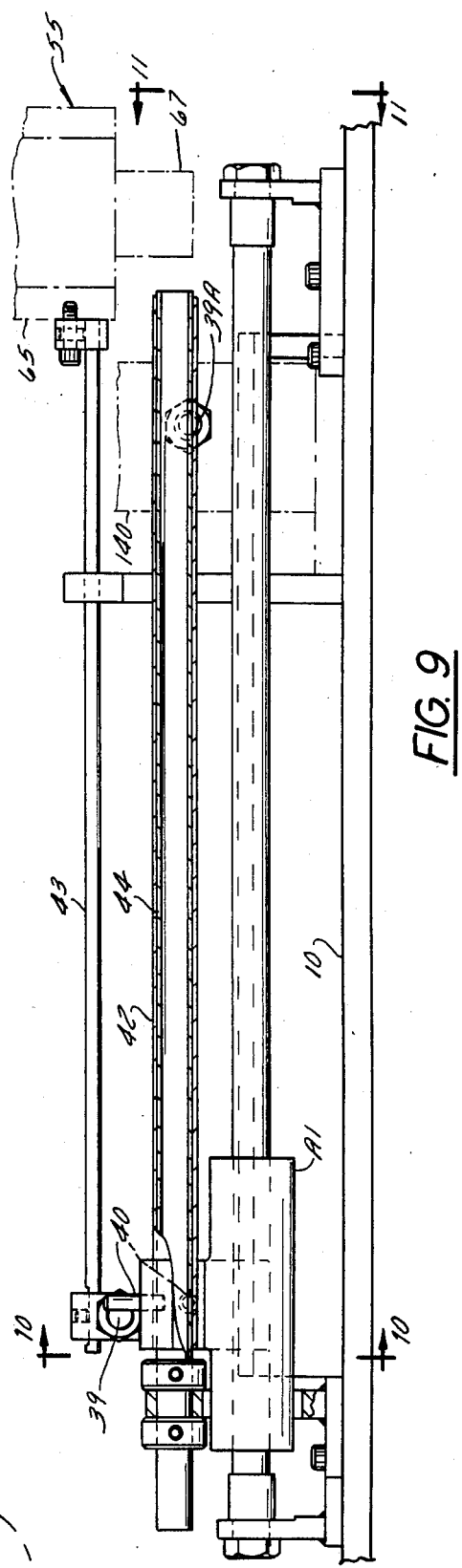

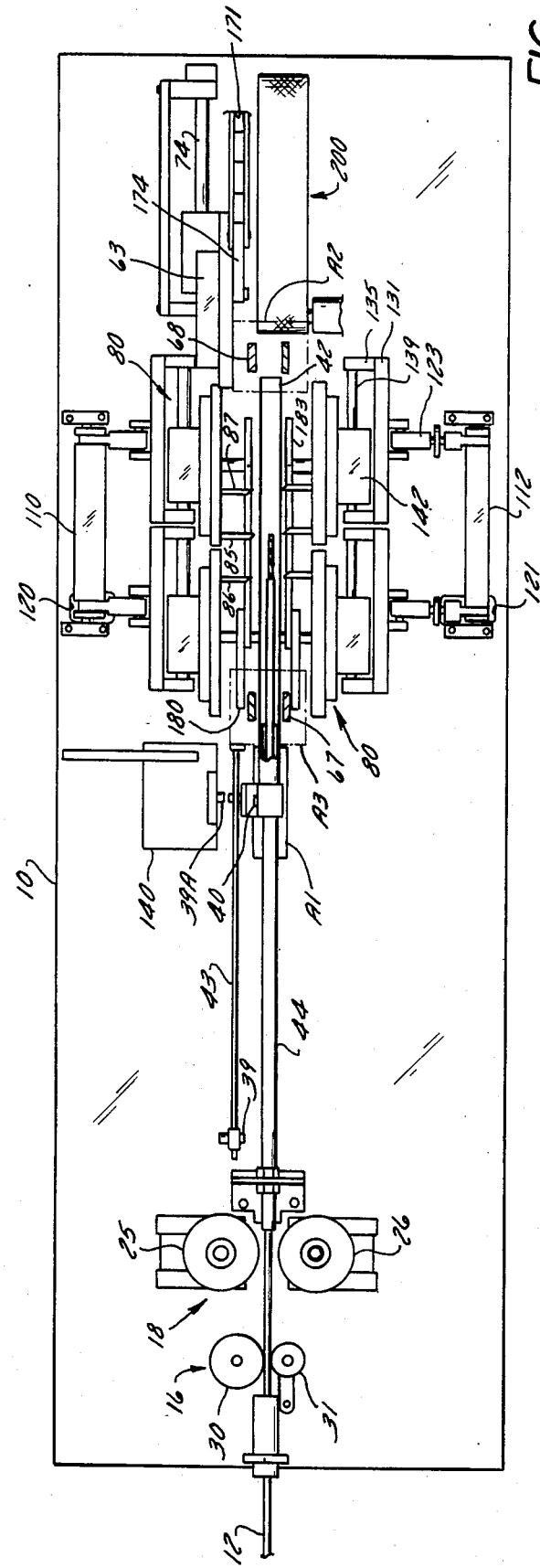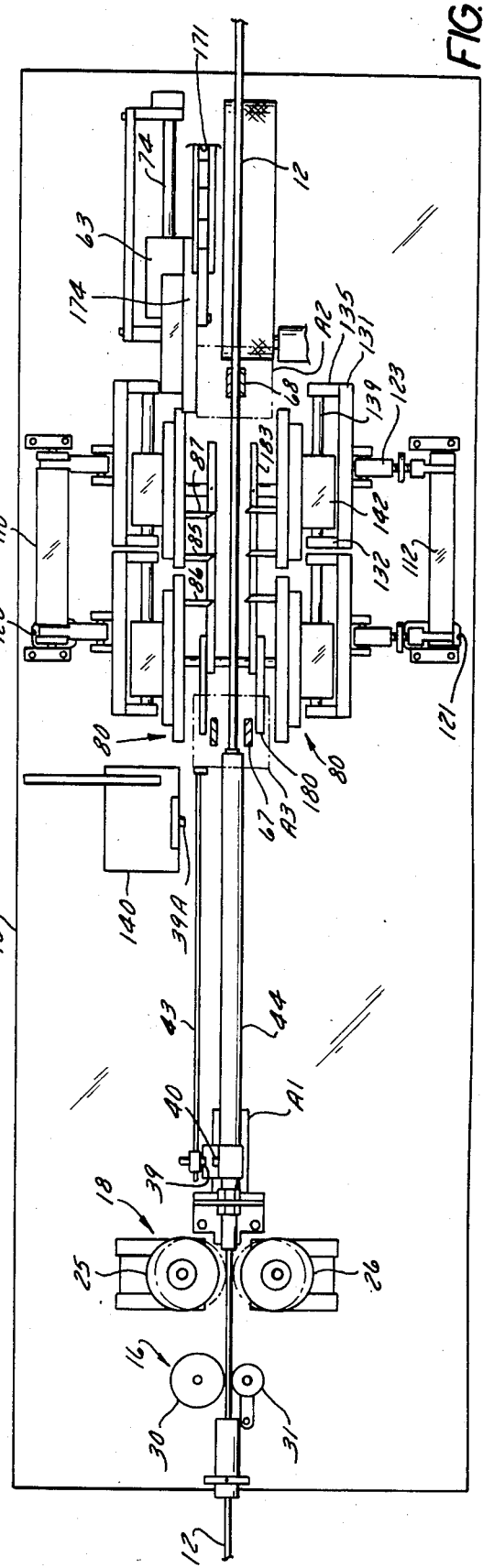
FIG. 13
FIG. 14

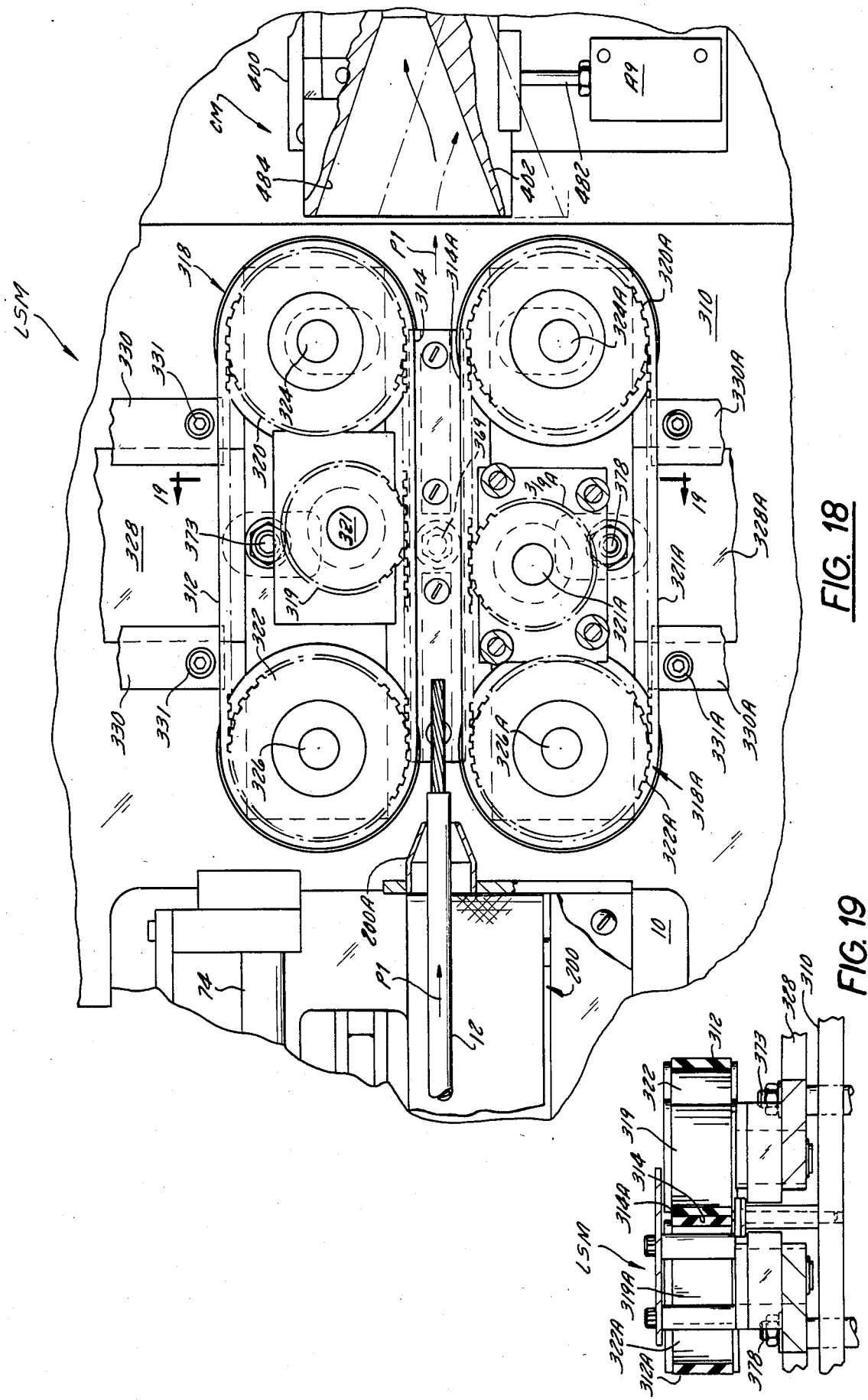

CUTTER/STRIPPER/COILING APPARATUS FOR THICK CABLE SEGMENTS

BACKGROUND OF THE INVENTION

1. Field of Use

This invention relates to apparatus for severing long segments from a strand of thick insulated multi-conductor electric cable, for stripping desired lengths of tough reenforced outer insulation sheath from the severed ends of the segments, and for coiling the stripped segments so that they can be subsequently used to manufacture heavy-duty electric cords.

In particular, the apparatus comprises a cutter/stripper machine, a long-strip attachment mechanism optionally usable therewith for stripping extra-long lengths of insulation from the cut segment, and a coiling mechanism optionally usable with the cutter/stripper machine (with or without the long-strip attachment mechanism).

2. Description of the Prior Art

Various types of wire cutter/stripper machines are known and commercially available for cutting wire segments of desired length from a strand of wire or cable and for stripping insulation from the ends thereof so that terminals can be attached thereto. As multi-conductor sheathed cables have become larger in diameter, the insulation sheath thereon tougher, the stripped portions longer, and the cut and stripped segments longer and more difficult to handle and store prior to terminal attachment, there is need for cutter/stripper/coiling apparatus which can address these problems.

U.S. Pat. No. 3,672,025 entitled "Terminal Applicator", issued June 27, 1972 to Ragnar Gudmestad and assigned to the same assignee as the present application, discloses a machine wherein wire segments are repeatedly cut from a continuous wire strand, stripped and then terminated. However, that machine is not adapted to process a large diameter, long cable segment with an especially tough insulation sheath thereon which sometimes needs extra-long stripping. Furthermore, that machine applies the terminals immediately after stripping and does not coil the stripped segments prior to terminal attachment. That machine employs a wire guide tube for precisely locating a wire in alignment with clamp assemblies in a terminal applicator press so as to assure accuracy in cutting, stripping and terminal attachment. The guide tube, through which the wire is threaded, is mounted on the press frame and is aligned with terminal applicators and the clamp assemblies and is free to follow the motion of the clamp assemblies into and out of the press frame. The guide tube is withdrawn from the press frame when the wire is to be cut by means of a cam, drive shaft and a rack-and-pinion drive assembly.

SUMMARY OF THE PRESENT INVENTION

The present invention provides improved easily adjustable cutter/stripper/coiling apparatus which is especially well-adapted to repeatedly sever cable segments (up to 328 feet in length) from a continuous strand of thick (up to one-half inch in diameter) multi-conductor electric cable, to strip desired lengths (up to twelve inches) of a tough outer re-enforced insulation jacket or sheath from the segment ends, and to coil the stripped segments so that they can be conveniently handled and/or stored prior to terminal attachment or other processing required for the manufacture of heavy-duty electrical cords.

The apparatus generally comprises three basic components, namely: a cutter/stripper machine for cutting segments of desired lengths from the strand and stripping the ends thereof (up to two inches), a long-strip attachment mechanism optionally usable with the cutter/stripper machine for stripping extra-long lengths of insulation (up to twelve inches) from the segments, and a coiling mechanism optionally usable with the cutter/stripper machine (with or without the long-strip attachment mechanism) for conveniently coiling the long cut and stripped segments which are to be subsequently used to manufacture heavy-duty electric cords.

The cutter/stripper machine comprises a cable feeder mechanism, including cable feed wheels which are intermittently driven by an electric motor to stop and start cable feed. The feed wheels are initially movable from open to closed positions for machine set-up. The cutter/stripper machine has an extendable/retractable cable guide tube for precisely positioning the cable strand with respect to a pair of relatively movable cable gripping clamps (one stationary and the other movable) and with respect to a movable cutter/stripper head located between the clamps.

The long-strip attachment mechanism has separable rotatable wire-gripping belts which operate, after the movable gripping clamp and the cutter/stripper head mechanism in the cutter/stripper machine have moved to effect partial stripping, to releasably grip the severed segments to effect final or complete stripping.

The coiling mechanism has a pair of alternately rotatable coil bowls into which successive cut and stripped segments are alternately directed for coiling through tubes by a shiftable wire guide.

A control system is provided for controlling each of the three basic components of the cutter/stripper/coiling apparatus. The control system includes a programmable electronic controller which receives signals from a cable-metering mechanism and proximity switch sensors in the cutter/stripper machine which are responsive to the axial position of the retractable/extendable cable guide tube. The programmable electronic controller operates a plurality of electric solenoid-controlled pneumatic actuators which effect synchronized operation of the tube, the cable feeder mechanism, the clamps and the cutter/stripper head mechanism in the cutter/stripper machine. The programmable electronic controller also effects synchronized operation of components in the long-strip attachment mechanism and in the coiling mechanism, if used.

The apparatus offers several advantages over the prior art. For example, the construction and mode of operation of the apparatus enables it to process a relatively thick cable strand having a very tough insulation sheath thereon, to sever extremely long cable segments therefrom, to strip short or relatively long portions of the sheath from the segments and to coil the segments. Furthermore, the apparatus is easily and quickly adjusted to process cables of various diameters, to provide cable segments of various lengths in desired quantities and to provide stripped portions of various lengths. The cutter/stripper machine of the apparatus includes an actuator which applies extra force to the movable clamp and cutter/stripper head mechanism to facilitate stripping of very tough insulation. Cutter/stripper heads having various blade arrangements can be interchangeably employed in the head mechanism to effect various types and lengths of stripping. For example, either the severed end of the cable strand or the severed end of the cable segment or both can be stripped, depending on blade arrangement. Positive sensing of the position of the extendable/retractable cable guide tube during each cycle of operation ensures correct and trouble-free cable feeding operations, reduces cutting errors and waste and protects against cutter/stripper blade damage. The long-strip attachment mechanism enables extra-long portions of the cable sheath to be automatically stripped from the severed end of the cable segment, despite limitations of cutter/stripper head travel in the cutter/stripper machine. The coiling mechanism rapidly coils long stripped segments and renders them compact and easy to handle, transport and store prior to terminal attachment. The optionally usable long-strip attachment mechanism and coiling mechanism are detachably mountable to the basic cutter/stripper machine and greatly enhance the versatility of the apparatus. The apparatus is compact in size and relatively uncomplicated in construction, yet is able to process large diameter cables, provide very long cable segments and lengthy stripped portions. The programmable electronic controller enables precise control and high speed operation. Other objects and advantages will hereinafter appear.

DRAWINGS

FIG. 8 is an enlarged top plan view of the tube showing it retracted;

FIG. 9 is a side cross-section view of FIG. 8;

FIG. 10 is a cross section view taken on line 10—10 of FIG. 9;

FIG. 11 is a cross section view taken on line 11—11 of FIG. 9;

FIG. 13 is a top plan view similar to FIG. 1 but showing the tube extended and both clamps open;

FIG. 14 is a view similar to FIG. 13 but showing the movable clamp closed, the stationary clamp open, and the tube retracted;

FIG. 18 is an enlarged top plan view, partially in section, of the long-strip attachment mechanism of FIG. 16;

FIG. 19 is a cross-section view taken on line 19—19 of FIG. 18;

DESCRIPTION OF PREFERRED EMBODIMENTS

General Arrangement

Figure 15:
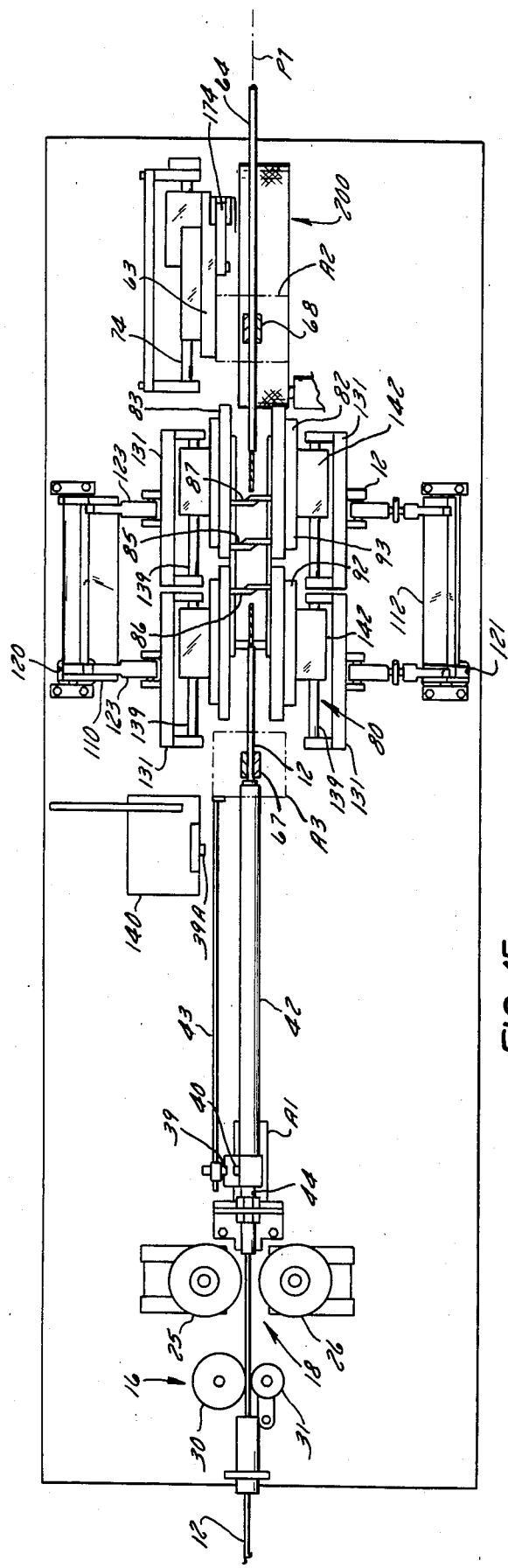
FIG. 15 is a view similar to FIG. 13 but showing both clamps closed and the movable clamp and cutter/stripper head mechanism moved.
Figure 17:
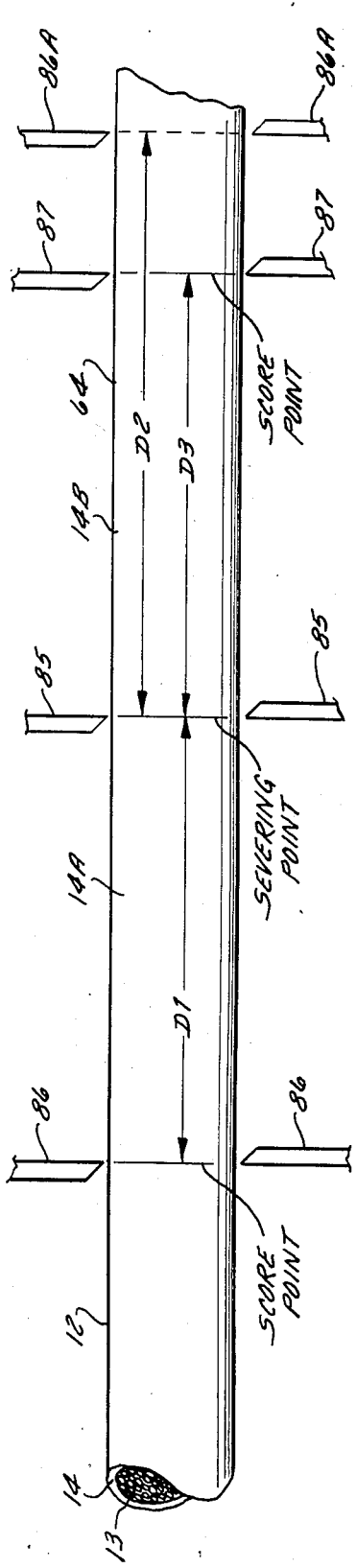
FIG. 17 is an enlarged side elevation view of the cable showing its construction.
Figure 16:
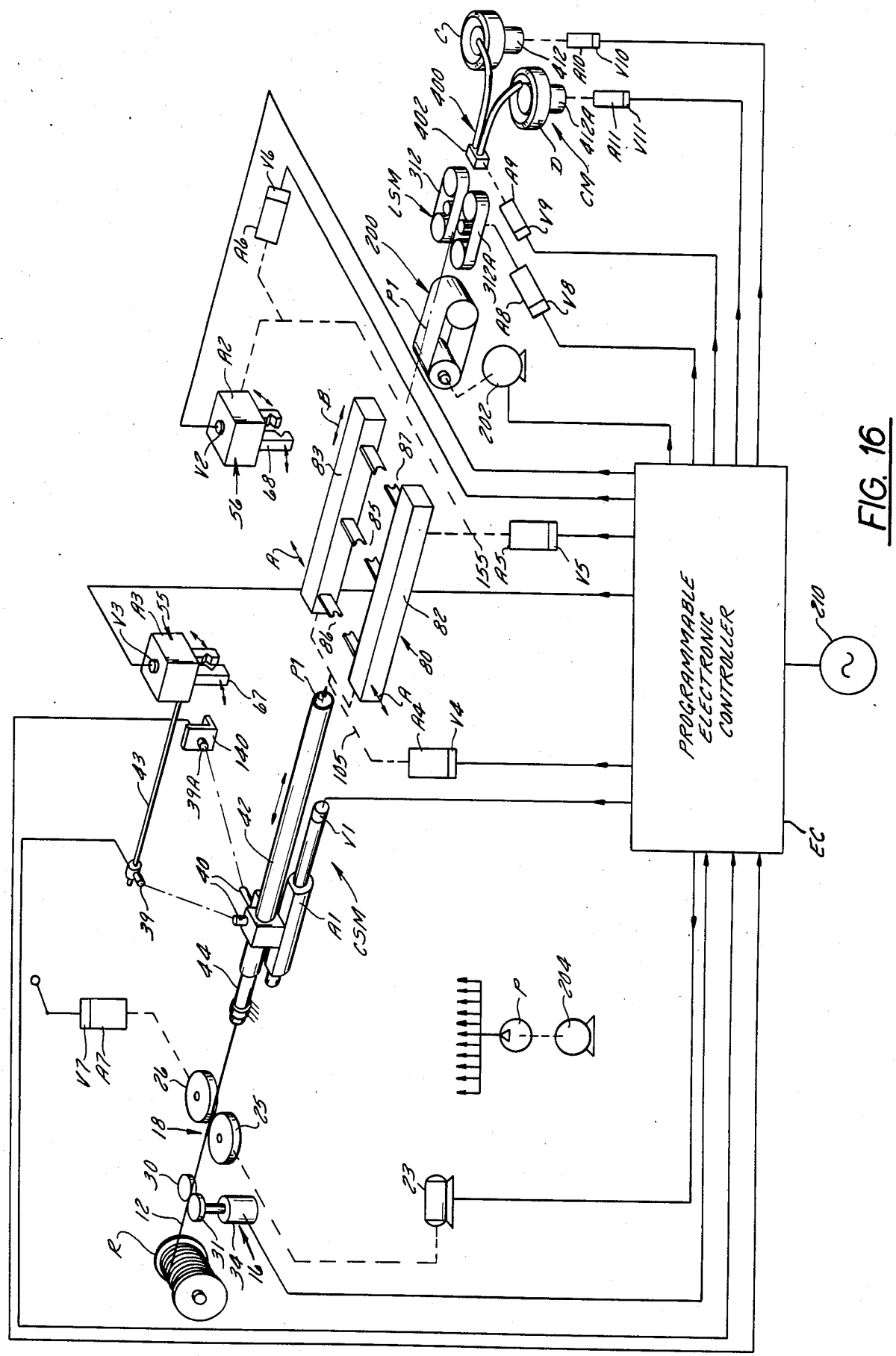
FIG. 16 is a schematic diagram of the electronic/pneumatic control system of the apparatus, including the cutter/stripper machine of FIG. 1, the long-strip attachment mechanism of FIGS. 18 through 21, and the coiling mechanism of FIGS. 22 through 24.

Referring to FIGS. 16 and 17, there is shown cutter/stripper/coiling apparatus which is especially well-adapted to repeatedly sever long cable segments 64 (FIG. 15) (up to 328 feet in length) from a continuous strand 12 of thick (up to one-half inch in diameter) multi-conductor electric cable supplied from a reel R, to strip from the severed ends relatively long portions 14A and 14B (up to twelve inches, for example) of a tough outer reinforced insulation jacket or sheath 14 which surrounds several insulated wires 13 comprising the cable, and to coil the stripped segments.

The apparatus generally comprises three basic components, namely: a cutter/stripper machine CSM (see FIGS. 1 through 16), an optionally usable long-strip attachment mechanism LSM (see FIGS. 16 and 18 through 21), and an optionally usable coiling mechanism CM (see FIGS. 16 and 22 through 24), each of which is described separately and in detail hereinafter.

Referring to FIGS. 1 through 16, the cutter/stripper machine CSM comprises an axially retractable/extendable cable guide tube 42 through which a desired length of cable strand 12 is fed by a cable feeder mechanism 18, while the tube is extended, to ensure proper feed of the cable strand along a path P1 into the apparatus. A pair of axially spaced apart cable gripping clamps 67 and 68 are located alongside path P1. Upstream clamp 67 is stationary and downstream clamp 68 is movable. When cable feed stops, movable clamp 68 closes to grip an already exposed part of cable strand 12 and tube 42 is retracted to expose a large portion of cable strand 12. Then, stationary clamp 67 closes to grip the exposed portion of cable strand 12. A cutter/stripper head assembly 80 having cutter blades 85 and stripper blades 86 and 87 thereon and located between the clamps 67 and 68 closes to sever cable strand 12 at a severance point and to score sheath 14 on both sides of the severance point. The cutter/stripper head assembly 80 is movable relative to stationary clamp 67 between "start" and "finish" positions. The movable clamp 68 is movable relative to cutter/stripper head assembly 80 between other "start" and "finish" positions. The closed cutter/ stripper head assembly 80 moves axially away from closed stationary clamp 67 (rightward in FIG. 17 toward its finish position) to thereby strip the scored sheath portion 14A (of length D1) from the severed end of cable strand 12, which strand is still gripped by closed stationary clamp 67. At the same time, closed movable clamp 68, which grips a severed cable segment 64, moves away from closed cutter/stripper head assembly 80 (rightward in FIG. 17 toward its finish position) to thereby strip the scored sheath portion 14B (of length D3) from the severed end of severed cable segment 64 and to axially separate severed cable segment 64 from cable strand 12. The closed movable clamp 68 moves for a longer distance and at a faster rate of speed than the closed cutter/stripper head assembly 80. After stripping, movable clamp 68 opens to release and dispose of cut and stripped cable segment 64, unto a conveyor 200 (FIGS. 16 and 18), driven by a motor 202, which receives and moves the stripped cable segment for further processing. Cutter/stripper head assembly 80 and stationary clamp 67 then open, cutter/stripper head assembly 80 and movable clamp 68 return to their respective start positions, retracted cable guide tube 42 extends, and another desired length of cable strand 12 is fed therethrough for cutting and stripping as above described.

Referring to FIGS. 16 and 18 through 21, in some instances it is necessary to strip a scored sheath portion 14B (FIG. 17) longer than two inches (length D3) from one end of segment 64 (i.e., of a length D2 of up to twelve inches, for example). Therefore, the optionally-usable long-strip attachment mechanism LSM is provided for this purpose and it requires that cutter/stripper machine CSM be provided with a cutter/stripper head assembly 80 which can effect insulation scoring between two and twelve inches downstream from the severance point. The long-strip attachment mechanism LSM comprises a pair of separable rotatable endless flexible wire-gripping belts 312 and 312A located on opposite sides of wire path P1 downstream of the finish position of movable clamp 68 of cutter/stripper machine CSM. The long-strip attachment mechanism LSM further comprises a motor 340 operable to rotatably drive the belts 312 and 312A and means, such as a solenoid-controlled pneumatic actuator A8, to open and close the wire-gripping belts 312 and 312A. The long-strip attachment mechanism LSM operates after the closed movable clamp 68 of cutter/stripper machine CSM has moved to its finish position, as hereinbefore described. At this stage of operation, the scored insulation portion 14B downstream of the severance point is longer (i.e., length D2) than the distance D3 the closed movable clamp 68 has travelled relative to cutter/stripper head mechanism 80 and, therefore, insulation portion 14B has not been completely stripped from the trailing end of severed segment 64. Accordingly, at this stage, movable clamp 68 is opened and the wire-gripping belts 312 and 312A (which are rotating) are closed, whereupon these belts grip the severed segment 64 and propel it along the path for a distance sufficient to complete the stripping of portion 14B (of length D2) from the trailing end of the segment. After this, the wire-gripping belts 312 and 312A re-open and cutter/stripper machine CSM completes its normal cycle of operation as hereinbefore described. The severed stripped segment 64 can then be disposed unto conveyor 200 for further processing.

Figure 22:
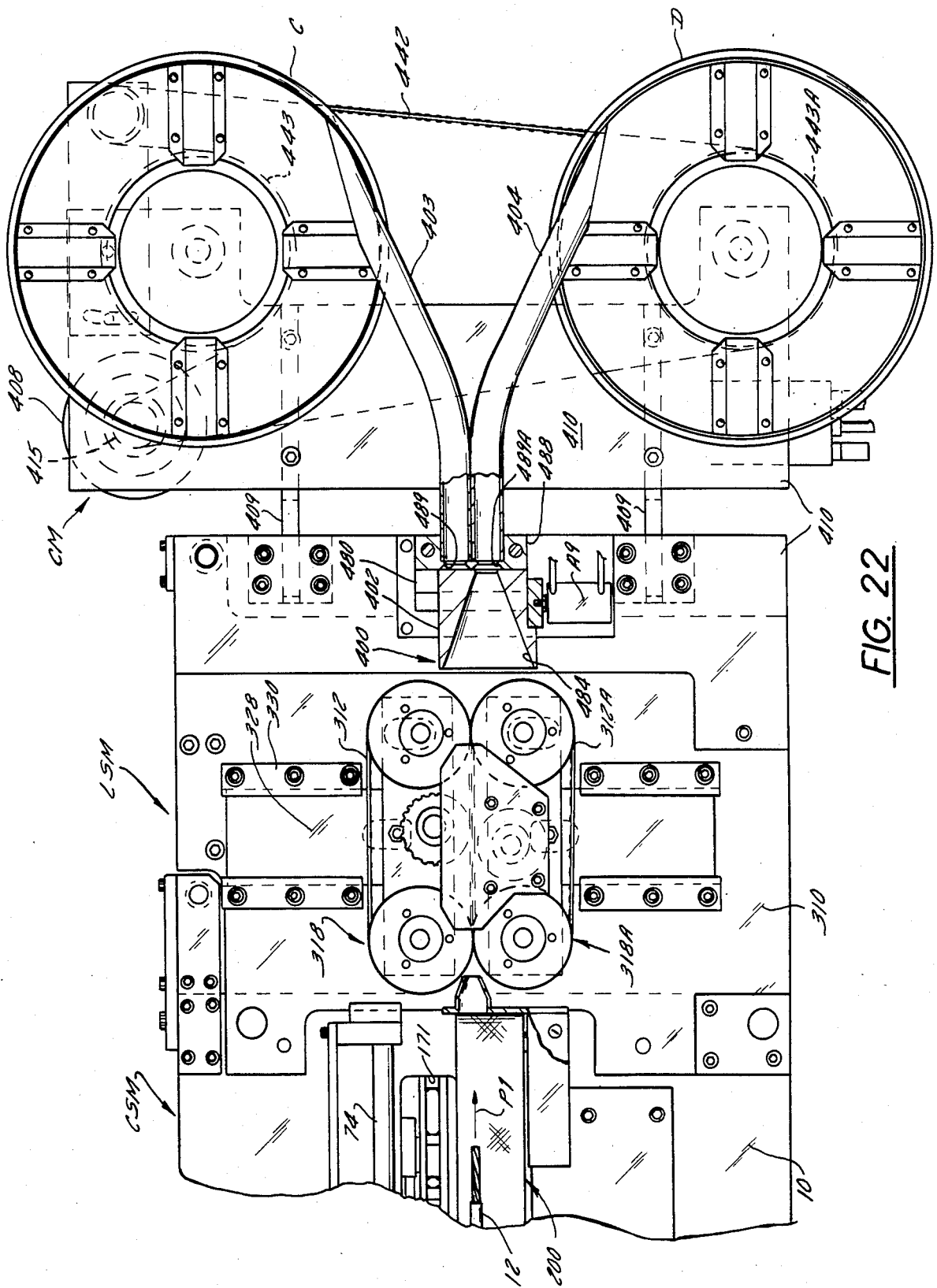
FIG. 22 is a top plan view of the coiling mechanism of FIG. 16.

Referring to FIGS. 16, 18 and 22 through 24, cutter/stripper machine CSM can provide extremely long wire segments 64 of up to 328 feet in length. Long wire segments are most conveniently handled and/or stored if they are coiled. Therefore, an optionally usable coiling mechanism CM is provided for use with cutter/stripper machine CSM, and can be used with or without the optionally usable long-strip attachment mechanism LSM. Coiling mechanism CM generally comprises a pair of alternately rotatable coil or coiling bowls C and D (each about 12 to 16 inches in diameter) located on opposite sides of wire path P1 downstream of cutter/stripper machine CSM (or long-strip attachment mechanism LSM, if used, as shown in FIG. 22). Coiling mechanism CM further comprises a wire guide assembly 400, including a wire guide 402, reciprocably movable between two positions by a solenoid-controlled pneumatic actuator A9 (FIG. 18) for receiving each cut and stripped segment 64 and for directing it through one or the other of two stationary wire guide tubes 403 or 404, into one or the other of the rotating coiling bowls C or D, respectively, wherein the segments are coiled. Such alternate feeding and coiling enables uninterrupted feeding and coiling of the segments 64, and a finished coil, such as 406 in FIG. 24, can be manually removed from one non-rotating bowl while another coil is still being formed in the other rotating bowl. Bowls C and D are rotatably driven alternately from a continuously rotating electric motor 408 which is alternately connectable to bowls C and D by means of solenoid-controlled pneumatic actuators A10 and A11, respectively, and clutch/drive mechanisms 412 and 412A, respectively, operated thereby.

FIG. 16 shows a control system for controlling the cutter/stripper/coiling apparatus and each of the three basic components thereof. The control system includes a programmable electronic controller EC which receives signals from a cable metering mechanism 16 and from proximity switch sensors 39 and 39a in cutter/stripper machine CSM which are responsive to the axial position of retractable/extendable cable guide tube 42. The programmable controller EC operates a plurality of electric solenoid-controlled pneumatic actuators, which are part of the control system and which effect synchronized operation of tube 42, cable feeder mechanism 18, the clamps 67 and 68 and cutter/stripper head mechanism 80 in cutter/stripper machine CSM, and also effect synchronized operation of long-strip attachment mechanism LSM and coiling mechanism CM.

Cable feeder mechanism 18 includes cable feed wheels 25 and 26 which are intermittently driven by an electric motor 23 to stop and start cable feed. The feed wheels 25 and 26 are initially movable from open to closed position during initial machine set-up. The clamps 67 and 68, cutter/stripper head assembly 80 and cable guide tube 42 are operated (i.e., axially moved and opened and closed) by five (first through fifth) pneumatic actuators A1 through A5 which, in turn, are operated by electric solenoid valves V1 through V5, respectively, connected to programmable electronic controller EC.

A sixth solenoid-controlled pneumatic (booster) actuator A6 operated by electronic controller EC is provided to apply additional force to closed movable clamp 68 and closed cutter/stripper head assembly 80 as they start to move during stripping to thereby facilitate separation of the scored tough sheath portions 14A and 14B.

A seventh pneumatic actuator A7, which is manually operated, is provided for selectively closing the cable feed wheels 25 and 26 of cable feeder mechanism 18 when a new wire strand 12 from a new reel R is inserted into cutter/stripper machine CSM during set-up.

The long-strip attachment mechanism LSM, which is adapted to complete the stripping of a longer sheath portion 14B (of length D3) from the severed end of a cable segment 64, comprises an eighth actuator A8 for automatically opening and closing the separable wire gripping belts 312 and 312A at a certain stage of operation.

The coiling mechanism CM comprises three actuators A9, A10 and A11 (ninth through eleventh). Actuator A9 operates for shifting wire guide 402 between its two positions. Actuators A10 and A11 are alternately actuatable for operating clutch/drive mechanism 412 and 412A, respectively, so that motor 408 can alternately rotate the coil bowls C and D.

Specific structural features of the apparatus will now be described in greater detail.

Cutter/Stripper Machine CSM

Referring to FIGS. 1, 2, 3 and 13 through 16, cutter/stripper machine CSM generally comprises a rigid support 9, including a horizontal table 10 and a vertical plate 11 and support brackets 15, all rigidly mounted on the underside of the table, as well as other brackets hereinafter identified and described.

Cable feeder mechanism 18 and metering mechanism 16 effect periodic feeding of a measured length of cable strand 12 from reel R along path P1 above table 10 for processing. Cable feeder mechanism 18 comprises the pair of rotatable separable cable feed wheels 25 and 26 which are rotatably driven periodically through an endless flexible belt 21 by electric motor 23 mounted beneath table 10. Motor 23 is a precisely controllable servo-motor which can be precisely started and stopped by programmable controller EC and runs intermittently during wire processing operations. Feed wheels 25 and 26 are closable (see FIG. 14) by manually operable feed wheel actuator A7 at the start of cable run, i.e., when a new cable reel R is being set up.

As FIG. 16 makes clear, each actuator A1 through A11 is a pneumatic actuator which is supplied with compressed air from a pump P which is driven by an electric motor 204. Actuator A7 is manually controlled by a manually operable valve V7. Each actuator A1 through A6 and A8 through A11 is supplied from pump P through its respective electrically operated on/off solenoid valve V1 through V6 and V8 through V11, which, in turn, is controlled by programmable electronic controller EC.

Cable feeder mechanism 18 feeds cable strand 12 through extendable/retractable wire guide tube 42 which is mounted above table 10 on a slide bar 44 and is periodically movable between extended (FIG. 13) and retracted (FIG. 14) positions by a guide tube actuator A1.

Metering mechanism 16 comprises a pair of metering rolls 30 and 31 which grip cable strand 12 and which are connected by a drive belt 20 to the rotatable shaft of a signal generator 34 mounted beneath table 10. Signal generator 34 is connected to programmable electronic controller EC and provides electric output signals indicative of the length of cable strand 12 drawn between the metering rolls 30 and 31 by the feed wheels 25 and 26. Controller EC is programmed to respond to signal generator 34 to determine when the feed wheels 25 and 26 are to be driven to start and stop cable feed of wire segments of desired length.

Cable strand 12 is fed through tube 42 while the latter is fully extended (FIG. 13). When cable feed stops, a small portion of cable strand 12 is exposed to movable clamp 68 (see FIG. 2) and is gripped by the movable clamp. When tube 42 is fully retracted, a larger portion of cable strand 12 is exposed (FIG. 14) and is gripped by stationary cable gripping clamp 67. The gripped cable strand 12 severed by closure of the pair of cutter blades 85 in cutter/stripper head mechanism 80, which is located between the clamp assemblies 55 and 56, to provide a cable segment 64 of desired length. Cutter/stripper head mechanism 80 also comprises a pair of stripper blades 86 upstream of the cutter blades 85 to score the sheath portion 14A on the severed end of cable strand 12 and a pair of stripper blades 87 downstream of the cutter blades 85 to score the sheath portion 14B (of length D3) on the severed end of cable segment 64. The pairs of stripper blades 86 and 87 also effect stripping of the scored end portions 14A and 14B as cutter/stripper mechanism 80 and movable clamp 68 move away from their respective start position.

Each clamp 67, 68 is part of clamp assembly 55, 56, respectively, which comprises a support frame 65, 66, respectively, on which the respective pair of clamps 67, 68 is mounted for movement between open and closed positions.

Figure 1:
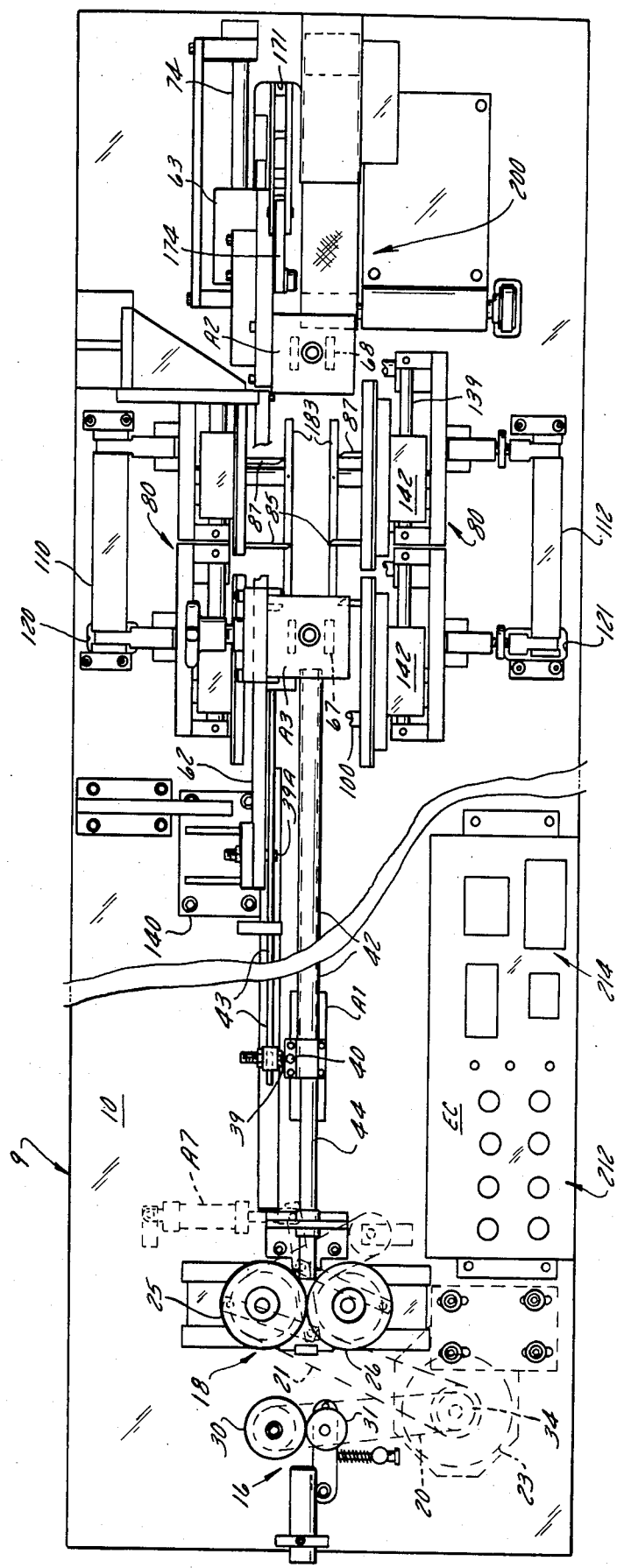
FIG. 1 is a top plan view of cutter/stripper machine of the apparatus in accordance with the invention and showing the cable feed mechanism, the extendable/retractable cable guide tube, the stationary and movable cable gripping clamps, the cutter/stripper head mechanism, and the tube position sensors.
Figure 2:
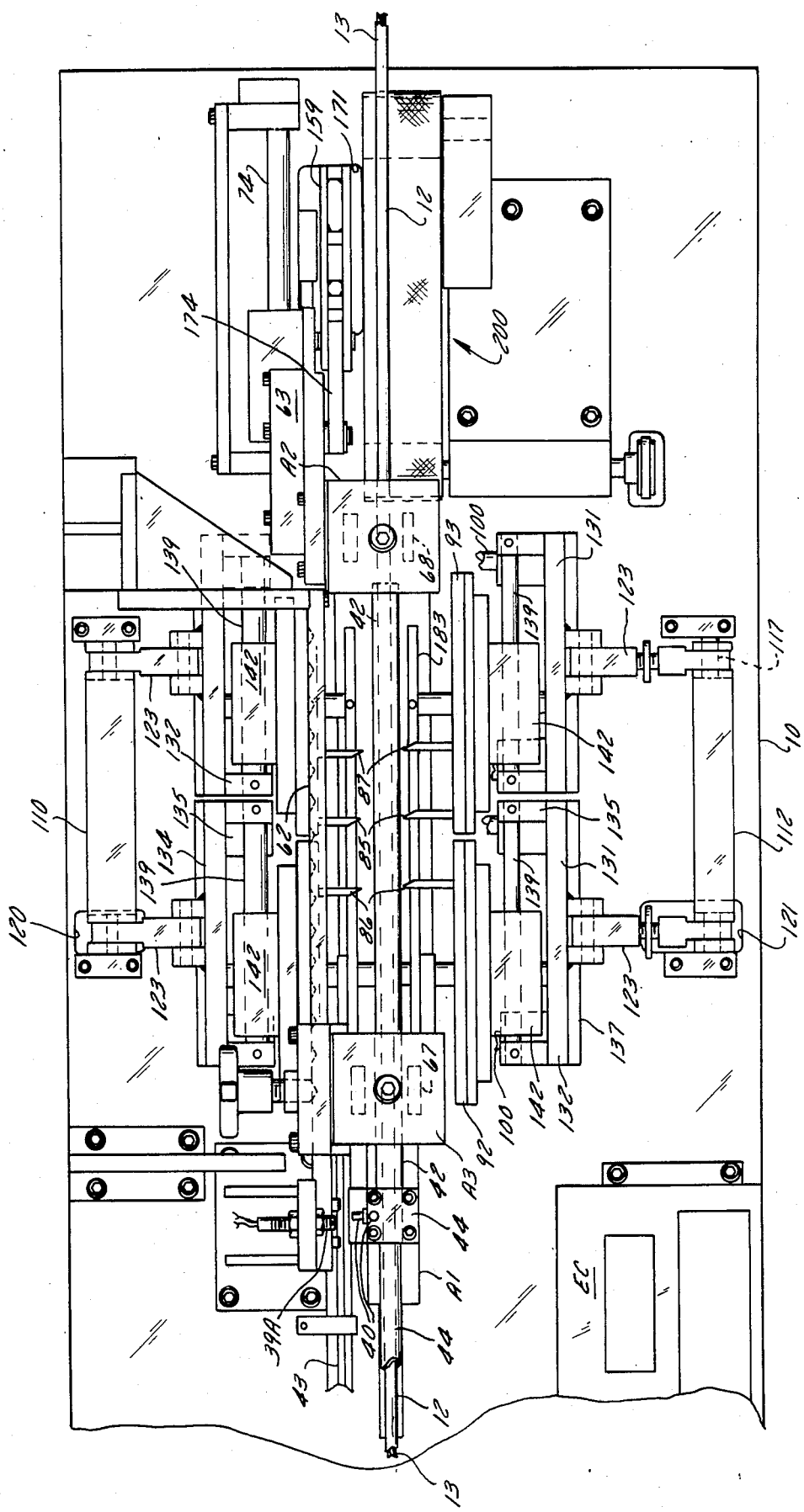
FIG. 2 is an enlarged top plan view of a portion of the machine of FIG. 1 with the tube extended and both clamps open.
Figure 3:
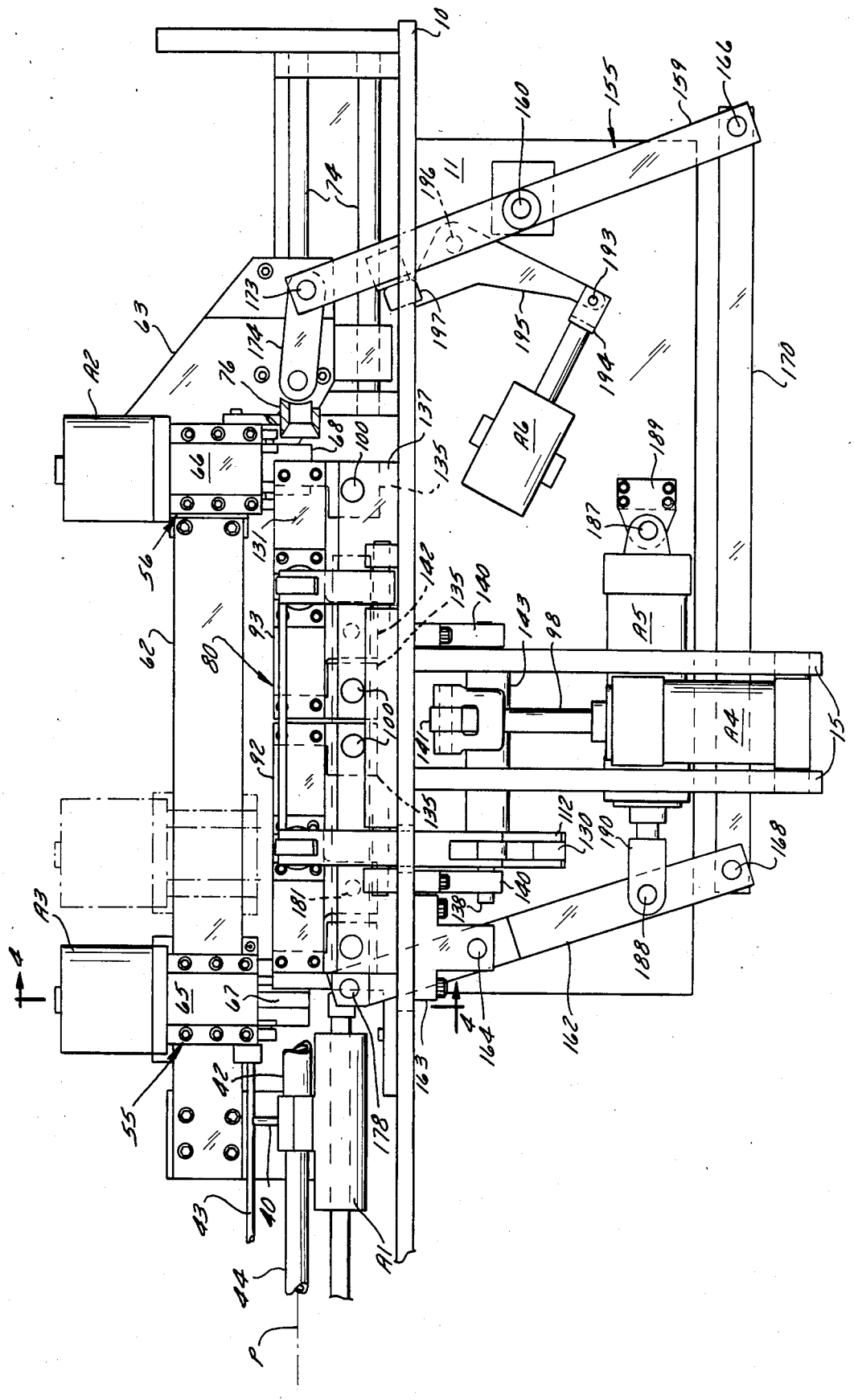
FIG. 3 is a side elevation view of the portion shown in FIG. 2.

Stationary clamp assembly 55, the clamp 67 of which grips cable strand 12 upstream of the severance point, is stationary during operation, but as comparison of FIGS. 1 and 2 shows, it can be adjustably positioned on support 62 by the machine operator during set-up, depending on the desired length of cable segment 64 to be processed.

Figure 6:
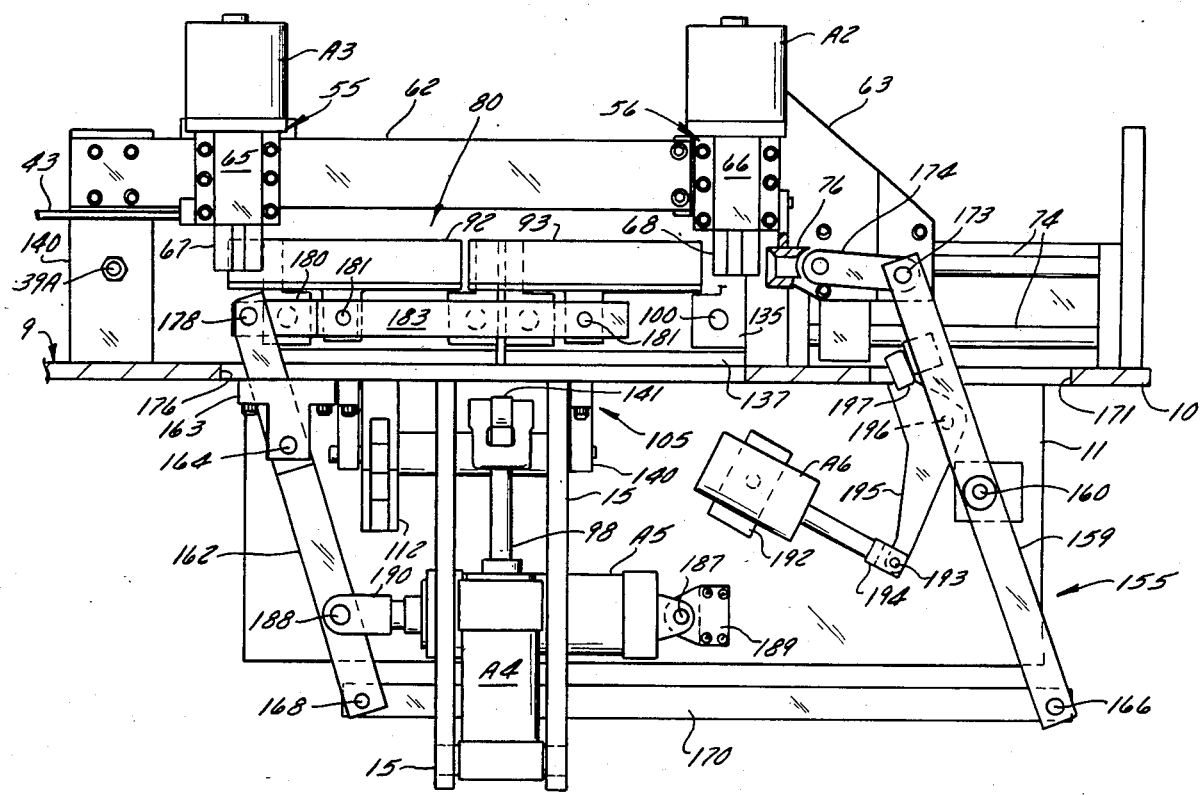
FIG. 6 is a view similar to FIG. 3 but showing the tube retracted.
Figure 7:
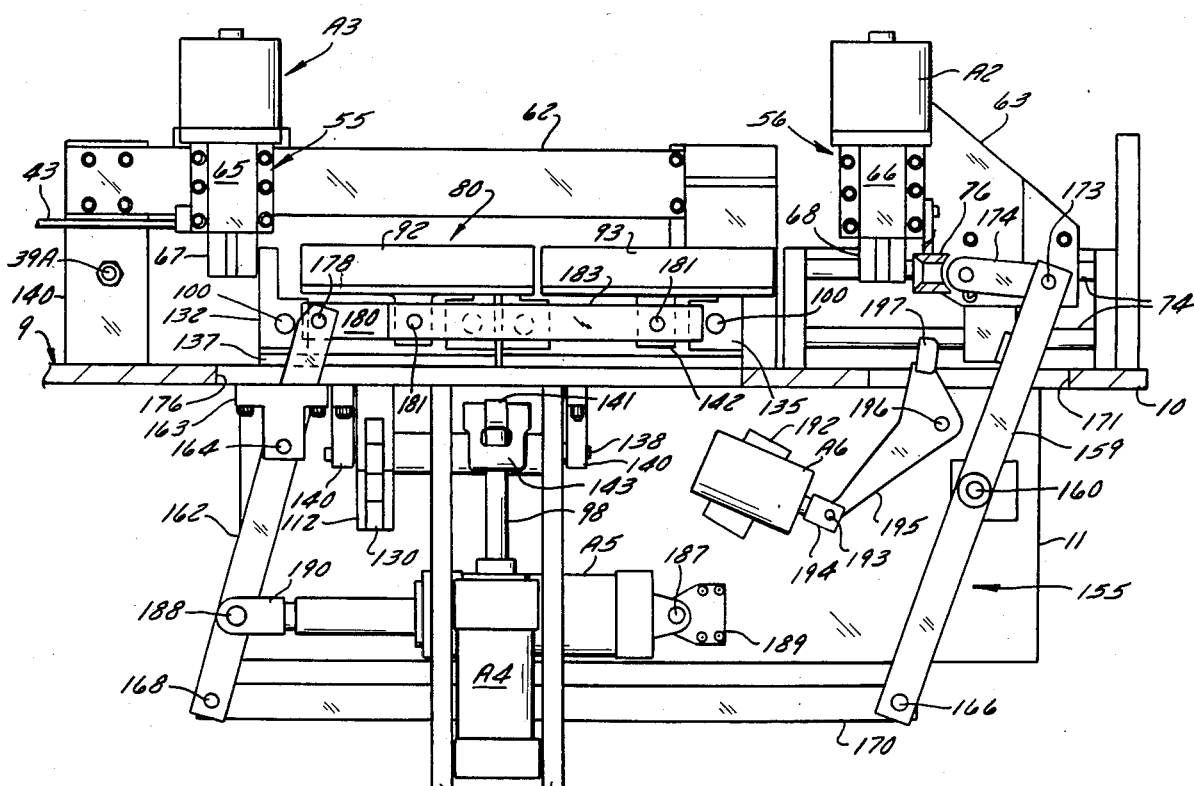
FIG. 7 is a view similar to FIG. 6 but showing the movable clamp and cutter/stripper head mechanism moved.

Movable clamp assembly 56 is rigidly mounted on a horizontally movable clamp support 63 located above table 10. Movable clamp support 63 is slidably mounted for horizontal movement by means of pneumatic actuator A5 between two positions (namely, a start position in FIG. 6 and a finish position in FIG. 7) on two horizontal slide bars 74 which are rigidly secured to table 10. A small wire guide 76 is rigidly mounted on clamp support 63 to support the trailing end of the severed cable segment 64 as it is moved axially. The clamp 68 of movable clamp assembly 56, which grips cable strand 12 downstream of the severance point, moves with clamp assembly 56, as comparison of FIGS. 6 and 7 show, to move the severed cable segment 64 axially to effect stripping of the severed end of the segment and to deliver it for final disposition, as to conveyor 200.

Pneumatic clamp actuators A3 and A2 cause opening and closing of clamps 67 and 68, respectively. FIGS. 1 and 13 show both clamps 67 and 68 open; FIG. 14 shows clamp 67 open and clamp 68 closed; and FIG. 15 shows both clamps 67 and 68 closed.

FIGS. 1 through 7 and 13, 14 and 15 show that wire cutter/stripper head mechanism 80 is positioned between the wire clamps 67 and 68 and operates to sever cable segment 64 from strand 12 and to strip portions 14A (of length D1) and 14B (of length D3) of sheath 14. Cutter/stripper head mechanism 80 comprises two cutter/stripper heads 82 and 83 which are horizontally spaced apart and located on opposite sides of path P1 and each head 82, 83 rigidly supports one cutter blade 85, one segment stripper blade 87 downstream of cutter blade 85 and one strand stripper blade 86 upstream of cutter blade 85. As FIG. 2 shows, each cutter/stripper head 82, 83 is preferably formed in two separately installable and removable units 92 and 93, with stripper blade 86 mounted on unit 92 and cutter blade 85 and stripper blade 87 mounted on unit 93. This arrangement allows for greater variety in possible cutter and stripper blade combinations and spacings. The head 82 (comprising its units 92 and 93) and the head 83 (comprising its units 92 and 93) are horizontally movable in unison on slide bars 100 transversely to path P1 (and cable strand 12) toward and away from each other between fully open position (FIGS. 1, 2, 4, 13 and 14) and fully closed position (FIGS. 5 and 15) by pneumatic cutter/stripper actuator A4. Actuator A4 is mounted on the support bracket 15 beneath table 10 and its vertical piston rod 98 is operatively connected by a linkage 105 (FIGS. 2, 4 and 5) to the cutter/stripper heads 82 and 83.

The cutter/stripper heads 82 and 83 (and the blades thereon) are also both simultaneously movable longitudinally parallel to path P1 between a start position (FIGS. 1, 2, 3 and 6) and a finish position (FIGS. 7 and 15) by pneumatic actuator A5, which also moves movable clamp support 63. As the cutter/stripper heads 82 and 83 close, segment 64 is severed from strand 12 by the cutter blades 85 and sheath 14 is cut or scored (but not yet stripped) on opposite sides of the severance point, as FIG. 17 shows.

Figure 4:
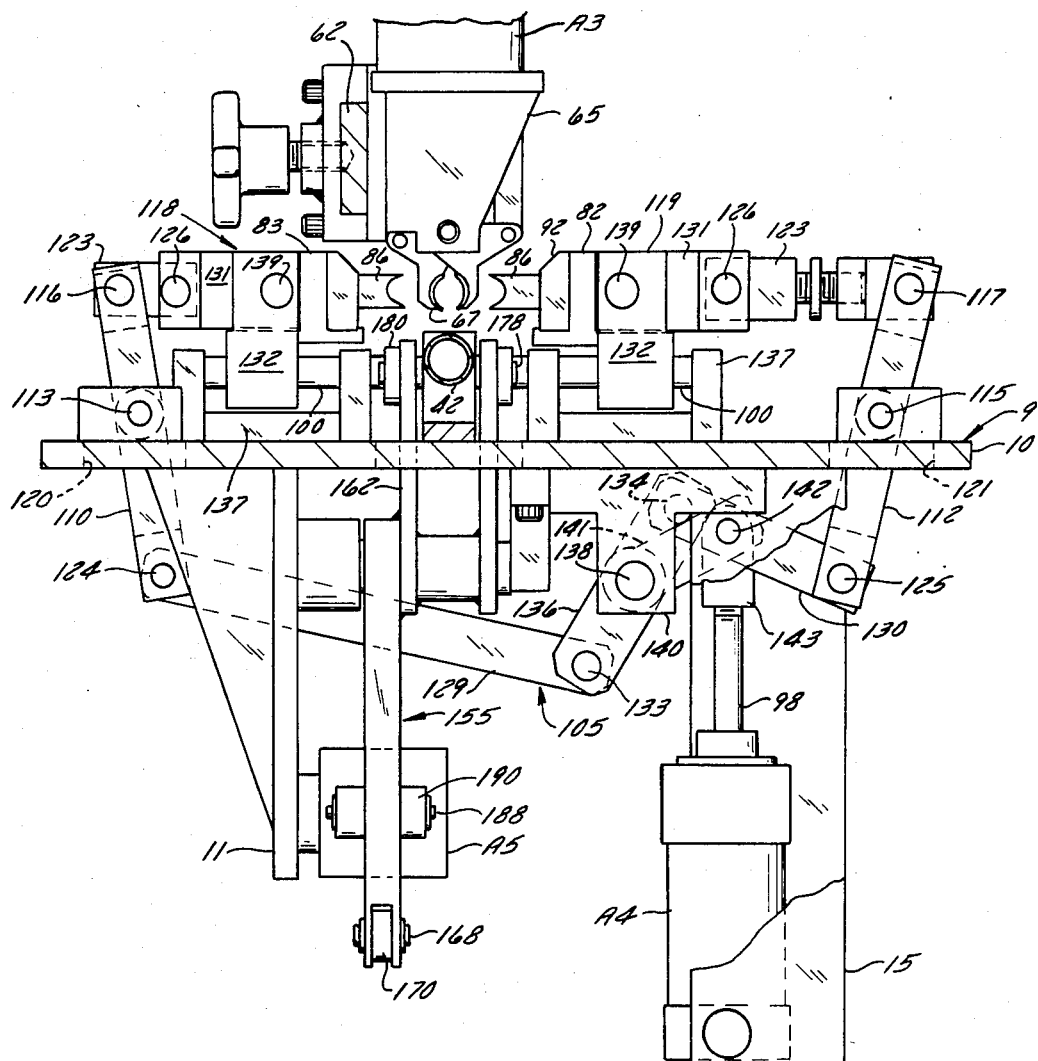
FIG. 4 is an enlarged cross-section view taken on line 4—4 of FIG. 3 showing one clamp closed and the cutter/stripper head mechanism open.
Figure 5:
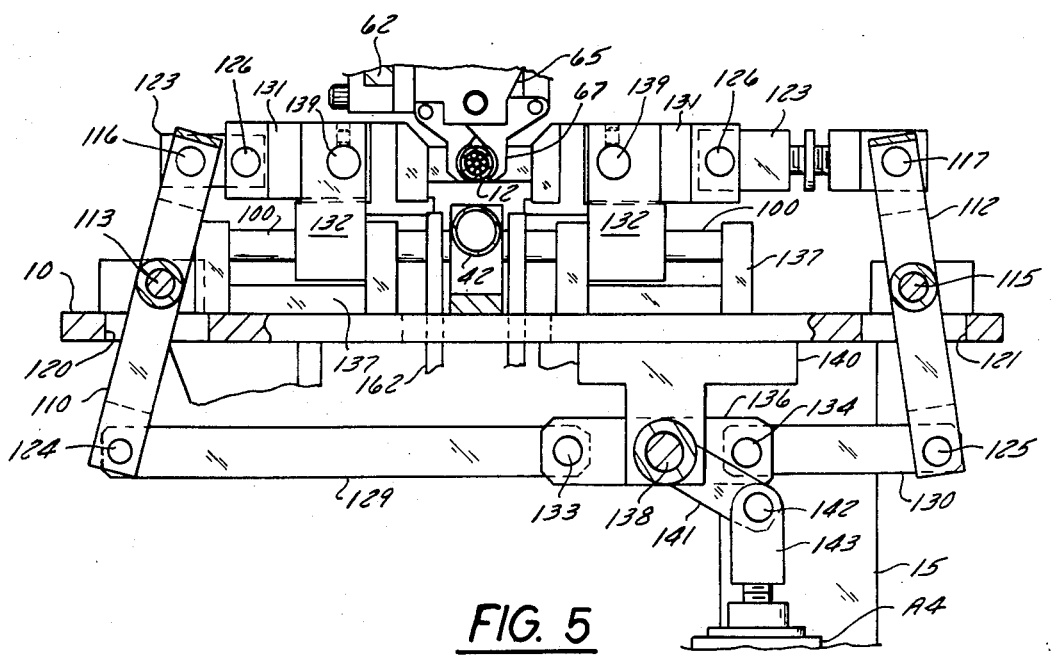
FIG. 5 is a view similar to FIG. 4 but showing the said one clamp and the cutter/stripper head mechanism both closed.
Figure 12:
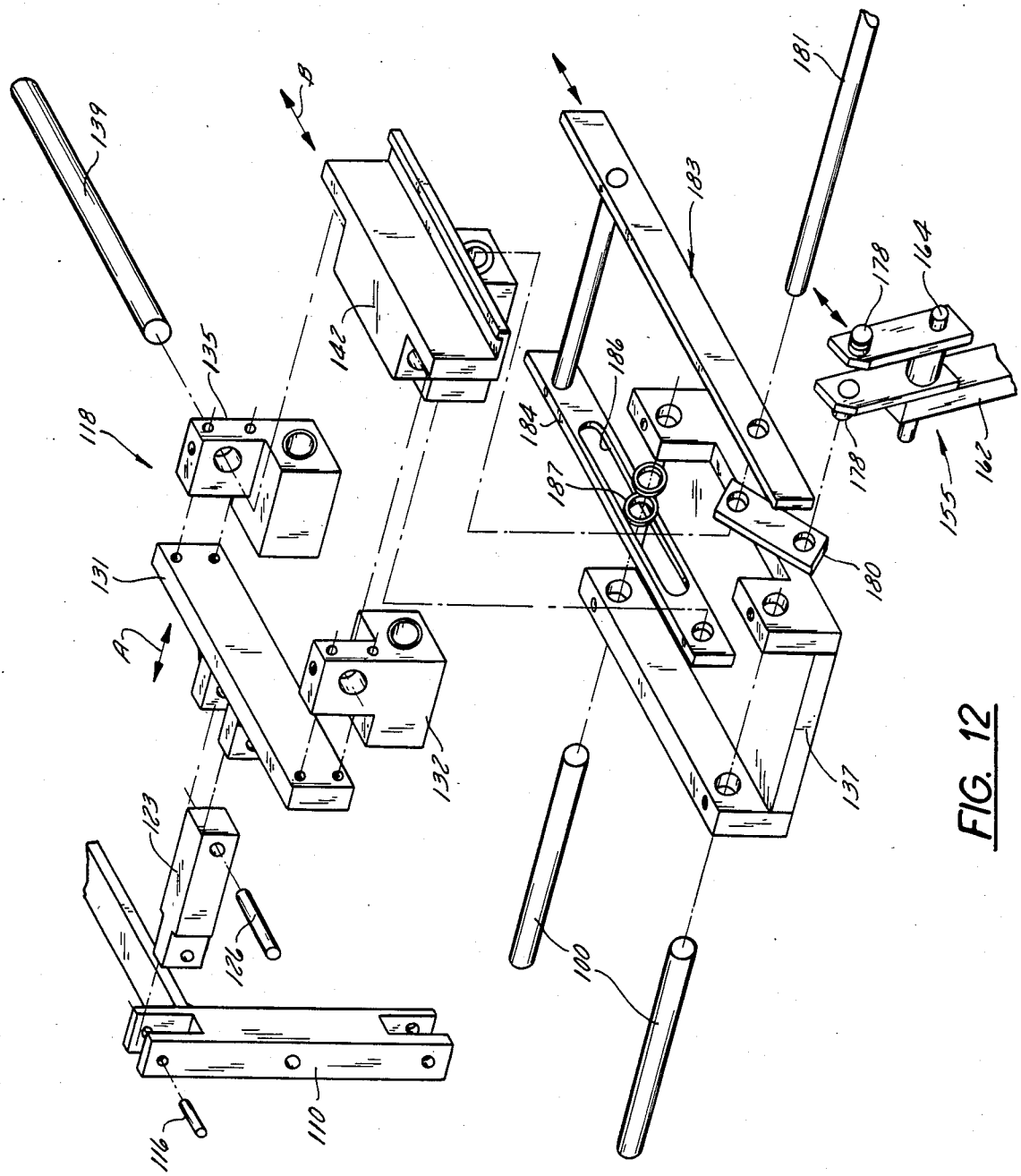
FIG. 12 is an exploded perspective view of a linkage for operating the cutter/stripper head mechanism and movable clamp.

As FIGS. 4, 5 and 12 show, linkage 105, which opens and closes the cutter/stripper heads 82 and 83, comprises two links 110 and 112 pivotally mounted on table 10 by pins 113 and 115, respectively, and having their upper ends pivotally connected by pins 116 and 117, respectively, to head support structures 118 and 119 on which the heads 83 and 82, respectively, are mounted. The lower ends of the links 110 and 112 extend through holes 120 and 121 in table 10 and are pivotally connected by pins 124 and 125, respectively, to the outer ends of arms 129 and 130, respectively. The inner ends of the arms 129 and 130 are pivotally connected by pins 133 and 134, respectively, to the outer ends of a toggle link 136 which is pivotally mounted by a pin 138 on a link support bracket 140 secured to the underside of table 10. Toggle link 136 has an offset arm 141 affixed thereto which is pivotally connected by a pin 142 and a clevis 143 to the upper end of piston rod 98 of pneumatic actuator A4. As FIG. 4 shows, when piston rod 98 of actuator A4 is fully extended, the upper ends of the links 110 and 112 pivot away from each other so as to open the cutter/stripper heads 82 and 83. Conversely, as FIG. 5 shows, when piston rod 98 is fully retracted the upper ends of the links 110 and 112 pivot toward each other so as to close the heads, respectively.

FIG. 12 shows the structural details of head support structure 118, and structure 119 is understood to be similar thereto, but reversed. Head support structure 118 comprises a link 123 for receiving pivot pin 116 at one end and for receiving another pin 126 at its opposite end by which it is pivotally connected to a plate 131. Plate 131, which is movable in the direction of arrow A in FIGS. 12 and 16, has slide bar connection blocks 132 and 135 rigidly attached to its opposite ends. The connection blocks 132 and 135 are slidably mounted on the slide bars 100 which extend transversely to path P1. The slide bars 100 are themselves supported on a rigid frame 137 which is rigidly secured to the upper side of table 10. The connection blocks 132 and 135 also support a slide bar 139 which extends parallel to path P1 and on which a slide block 142 is slidably mounted for movement parallel to path P1 in the direction of arrow B in FIGS. 12 and 16. Cutter/stripper head 83 is detachably mounted on slide block 142 by means of screws (not shown). Slide block 142 is slidably moved in the direction of arrow B by a linkage 155, hereinafter described, in response to operation of actuator A5.

The support structures 118 and 119 for the cutter/stripper heads 82 and 83, respectively, are also mounted so that the heads 82 and 83 (while closed) move in unison longitudinally, when proceeding from start position to final position. The heads 82 and 83 move at a slower rate and for a shorter distance than movable clamp 68 of clamp assembly 56 which grips severed cable segment 64. As a result of this differential movement, the scored portion 14A of sheath 14 on the severed end of cable strand 12 is stripped by stripper blades 86 and then, as movable clamp 68 continues to move, the stripper blades 87 strip the scored portion 14B (of length D3) of sheath 14 from the severed end of cable segment 64.

As FIGS. 6, 7 and 12 show, such differential longitudinal movement of movable clamp assembly 56 and the cutter/stripper heads 82 and 83 (which move in unison with each other in the direction of arrow B) is effected by pneumatic actuator A5 and linkage 155. Linkage 155 comprises a relatively long lever arm 159 which is pivotally mounted on support plate 11 by a pin 160 and a relatively shorter lever arm 162 which is pivotally mounted on a bracket 163 on the underside of table 10 by a pin 164. The lower ends of the lever arms 159 and 162 are pivotally connected by pins 166 and 168, respectively, to the opposite ends of a horizontally extending cross-arm 170. The upper end of longer lever arm 159 extends through a hole 171 in table 10 and is pivotally connected by a pin 173 to a link 174 which is rigidly secured to movable clamp support bracket 63. The upper end of shorter lever arm 162 extends through a hole 176 in table 10 and is pivotally connected by a pin 178 to drive the cutter/stripper heads 82, 83 in the direction of arrow B (FIG. 12).

More specifically, pin 178 is pivotally connected to one end of a link plate 180. The other end of link plate 180 is pivotally connected to a shaft 181 on which slide block 142 is slidably mounted for movement in the direction of arrow A. Shaft 181 and slide block 142 are moved in the direction of arrow B by pivotal motion of lever arm 162. Shaft 182 is supported at one end of a guide assembly 183 which includes a guide bar 184 which has a guide slot 186 therein in which one of the slide bars 100 is slidably received. Guide assembly 183 is guided for movement in the direction of arrow B by slot 186. An anti-friction bearing assembly 187 on the slide bar 100 and in slot 186 facilitates such motion.

The cylinder of actuator A5 is pivotally connected to support plate 11 by a pivot pin 187 and bracket 189 and the piston rod of actuator A5 is pivotally connected by a pin 188 and a clevis 190 to the lower end of short lever arm 162. When the piston rod of actuator A5 moves from retracted position (FIG. 6) to extended position (FIG. 7), both lever arms 162 and 159 pivot clockwise to effect longitudinal motion of the cutter/stripper heads 82 and 83 and of the movable clamp 68 in the stripping direction from their respective start positions to their respective finish positions, with clamp 68 moving farther and faster because of the longer length of the upper portion of lever arm 159 between pivot pins 160 and 173.

The cylinder of booster actuator A6 is pivotally connected to support plate 11 by a pivot plate 192 and the actuator piston rod is pivotally connected by a pivot pin 193 and a clevis 194 to the lower end of a bell crank 195 which is pivotally mounted by a pivot pin 196 on support plate 11. The upper end of crank 195 has a bumper 197 thereon which is releasably engageable with the upper end of long lever arm 159 to add force to its movement to aid in tearing loose the tough scored portions 14A and 14B of sheath 14.

As FIGS. 1, 2 and 16 show, guide tube position sensor means, which includes the proximity switch sensors 39 and 139, is provided for detecting when wire guide tube 42 is in fully retracted or fully extended position. Proximity switch 39 is stationarily mounted on one end of a switch support rod 43 which has its other end rigidly secured to support frame 65 of stationary clamp assembly 55 but adjustably positionable along with clamp assembly 55. Proximity switch sensor 139 is mounted in a fixed position on table 10 by means of a bracket 140. Two steel pins 40 on the base of guide tube 42 actuate the proximity switch sensors 39 and 139.

As FIG. 16 shows, the control system for the apparatus comprises programmable electronic controller EC, which has a control panel which is mounted on table 10, and is energized from a source of electric power 210. Controller EC operates motor 23 of cable feed mechanism 18, motor 202 for conveyor 200 and the electric solenoid valves V1 through V10 (excepting V7 which is a manually controlled valve). Controller EC receives input signals from an array 212 of push button control switches thereon (FIG. 1), from the two proximity switch sensors 39 and 139, and from signal generator 34 of metering mechanism 16 to effect synchronized movement and operation of the various apparatus components. Controller EC includes digital read-out displays 214 (FIG. 1) for indicating to the human operator numerical data pertaining to operation of the apparatus, such as length of cable segment 64 to be cut, length of stripped portions 14A and 14B, number of cable segments 64 to be cut, or already cut, and so forth.

As previously explained, cutter/stripper machine CSM employs six solenoid-controlled pneumatic actuators A1 through A6 and also employs pneumatic actuator A7 which is manually controlled by valve V7 for selectively opening and closing the feed wheels 25 and 26 of the cable feeder mechanism 18 during initial machine set-up. In addition, because of the toughness of the sheath to be stripped, solenoid-controlled pneumatic booster actuator A6 operates to apply additional force to move movable clamp 68 and the cutter/stripper heads 82 and 83 during stripping to thereby facilitate separation of the scored tough sheath portions 14A and 14B.

Operation of the cutter/stripper machine CSM is as follows. Initially assume: that the feed wheels 25 and 26 are closed; that the metering rolls 30 and 31 are closed; that guide tube 42 is extended; that sensors 39 and 139 signal programmable controller EC (which has been pre-programmed for desired segment length) that guide tube 42 is extended; that both clamps 67 and 68 are open; that the cutter/stripper heads 82 and 83 are open; that the movable cutter/stripper head mechanism 80 and movable clamp 67 are both in their respective start positions; and that cable strand 12 is disposed between the metering rolls 30 and 31 and between the feed wheels 25 and 26.

With these assumptions, one cycle of operation is automatically carried out by programmable controller EC as follows:

(1) Programmable controller EC effects rotation of feed wheels 25 and 26 until a desired length of cable strand 12 (indicated by the display 214 on controller EC) is fed through guide tube 42 and between the open movable clamp 68, whereupon rotation of the feed wheels 25 and 26 stops and wire feed stops.

(2) Actuator A2 extends to close right-hand movable clamp 68 so that it engages the cable strand 12 exposed at the end of guide tube 42 (FIG. 14).

(3) Actuator A1 operates to retract guide 42 and sensors 39 and 139 signal this fact to controller EC to thereby enable further operation.

(4) Actuator A3 extends to close left-hand stationary clamp 67 so that it engages the cable strand 12 exposed by the retracted guide tube 42.

(5) Actuator A4 extends to close the cutter/stripper heads 82 and 83 thereby severing the cable strand 12 and scoring insulation on both sides of the cut (note, however, that scoring could be carried out on either instead of both sides of the cut if the stripper blades were so selected and arranged).

(6) Actuator A5 extends to effect movement of both the cutter/stripper heads 82 and 83 (i.e., cutter/stripper head mechanism 80) and movable clamp 68 from their respective start positions to their respective finish positions to effect wire segment separation and stripping.

(7) Actuator A6 extends at the same time as actuator A5 to add force to the pivotal movement of link 159 to aid in stripping.

(8) Actuators A4, A3 and A2 retract to open the cutter/stripper heads 82 and 83, to open stationary clamp 67 and to open movable clamp 68, respectively, and the severed stripped segment 64 is dropped onto conveyor 200.

(9) Actuator A5 retracts to return the cutter/stripper heads 82 and 83 (i.e., cutter/stripper head mechanism 80) and movable clamp 68 to their respective start positions and actuator A6 retracts out of the return path of link 159.

(10) Actuator A1 operates to extend guide tube 42.

At this point, the next cycle of operation can commence.

Long-strip Attachment Mechanism LSM

The long-strip attachment mechanism LSM, which is adapted to sever an even longer stripped portion 14B (of length D2) from the severed end of segment 64, employs the pair of separable rotatable wire-gripping belts 312 and 312A, the actuator A8 to open and close the belts, and the electric motor 340 to rotatably drive the belts. Actuator A8 automatically opens and closes the wire-gripping belts 312 and 312A at a certain stage of operation of cutter/stripper machine CSM and their rotation effects completion of stripping of an extra long sheath portion 14B from the severed end of segment 64 (see distance D2 in FIG. 17).

As is apparent from FIGS. 15 and 17, in the basic operation of cutter/stripper machine CSM, the length of portion 14B of insulation sheath 14 stripped from the severed end of segment 64 (held back by stripper blades 87 as movable clamp 68 moves away therefrom) is limited by the distance movable clamp 68 can travel as it moves from its "start" to "finish" position. Such distance must be at least as great as the distance D3 in FIG. 17 between blades 85 and 87. Therefore, to enhance the utility of the apparatus by enabling it to strip an insulation portion 14B of greater length (D2) than the distance (D3), the optionally usable long-strip attachment mechanism LSM, shown in FIGS. 16 and 18 through 22, is provided to enable operation as explained hereinafter.

Long-strip attachment mechanism LSM comprises a rigid support 309, including a horizontal table 310 which is coplanar with and attachable to table 10 of cutter/stripper machine CSM. The two endless flexible wire-gripping belts 312 and 312A are located above table 310 on opposite sides of path P1 so that their confronting flights 314 and 314A are parallel to each other. The flights 314 and 314A are movable simultaneously toward each other to a wire-gripping position (FIG. 22) by actuator A8 wherein they can grip and complete the stripping of a severed wire segment 64 which is to be long-stripped. The flights are also movable away from each other to a wire-release position (FIG. 18) by actuator A8. Belts 312 and 312A are notched on their inside surface so that they can be positively driven and moved by the various pulleys with which they are engaged.

Figure 21:
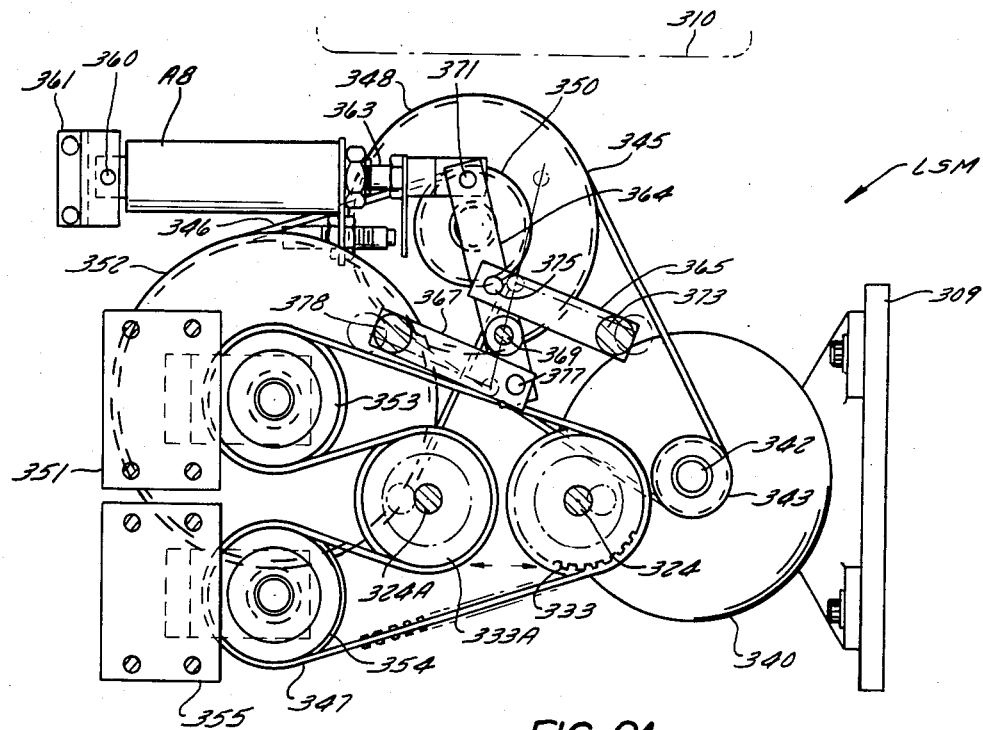
FIG. 21 is a sectional view taken on line 21—21 of FIG. 20.
Figure 20:
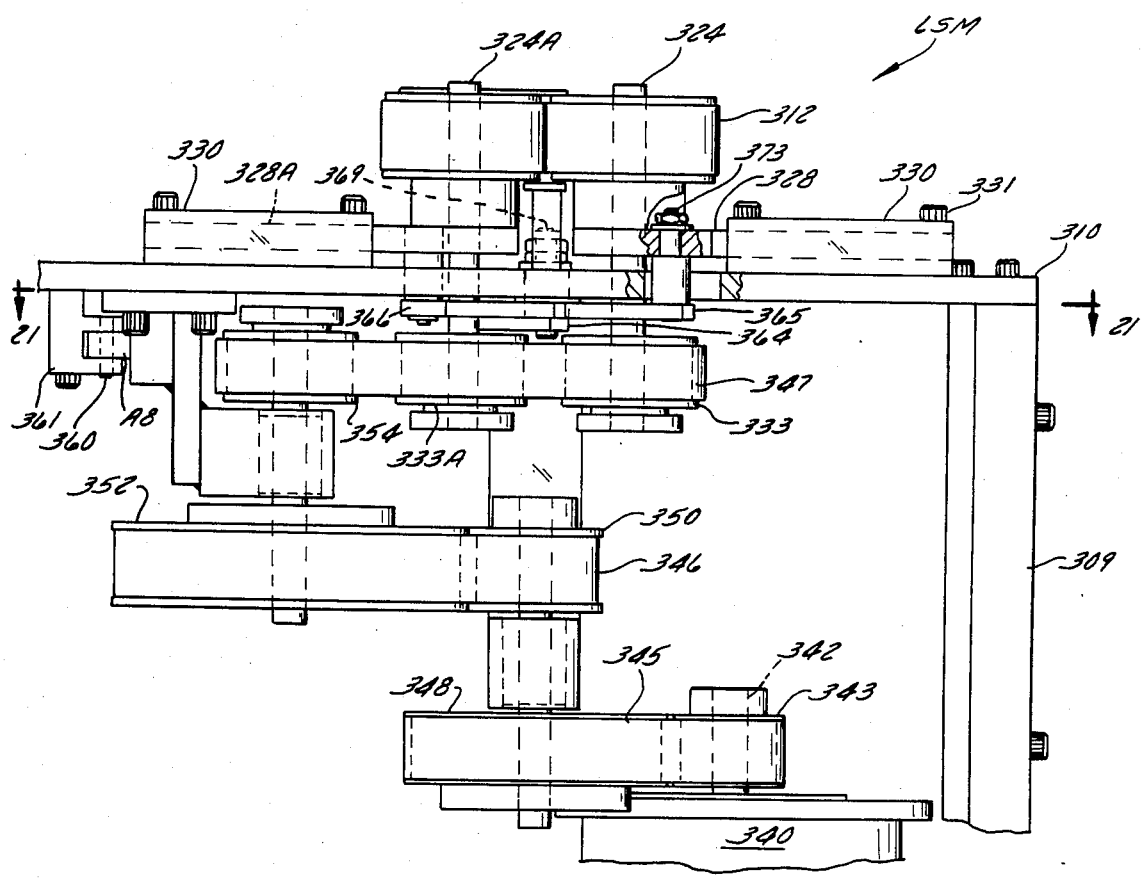
FIG. 20 is an end elevation view of the mechanism of FIG. 19.

As FIG. 18 shows, belt 312 is part of a belt assembly 318 which comprises a driven pulley 320 and an idler pulley 322 (around which belt 312 is reeved) which are affixed to the upper ends of rotatable shafts 324 and 326, respectively. A smaller second idler pulley 319, affixed to a rotatable shaft 321, engages the inside of belt flight 314 to maintain flight 314 in tight engagement with wire segment 64. The shafts 324, 326 and 321 are rotatably mounted on a generally T-shaped (viewed in FIG. 18) shaft support plate 328 which is slidably mounted on a pair of stationary support brackets 330 affixed by screws 331 to the top of table 310. As FIGS. 20 and 21 show, shaft 324 has a pulley 333 affixed to its lower end.

As will be understood, belt 312A is part of a belt assembly 318A which is similar in construction and mode of operation to belt assembly 318, but is a mirror image thereof, and the numerals of corresponding parts in belt assembly 318A bear the suffix "A".

Motor 340 is mounted beneath table 310 on support 309 and its motor shaft 342 has a motor pulley 343 affixed thereto. Motor 340 is adapted to rotatably drive the shafts 324 and 324A on which the driven pulleys 333 and 333A, respectively, for the belts 312 and 312A, respectively, are mounted to thereby effect belt rotation. In particular, three endless flexible drive belts 345, 346 and 347 are connected in driving relationship between motor pulley 343 and the drive pulleys 333 and 333A as follows. Belt 345 is reeved around motor pulley 343 and around a larger diameter pulley 348 of a first speed reduction pulley assembly mounted on a support bracket 349 affixed to the underside of table 310. Belt 346 is reeved around a smaller diameter pulley 350 of the first speed reduction pulley assembly and around a larger diameter pulley 352 of a second speed reduction pulley assembly mounted on a support bracket 351 affixed to the underside of table 310. Belt 347 is reeved around a smaller diameter pulley 53 of the second speed reduction pulley assembly, around belt drive pulley 333A, around an idler pulley 354 rotatably supported on a support bracket 355 affixed to the underside of table 310, and around belt drive pulley 333.

The T-shaped support plates 328 and 328A for the belt drive shafts 324 and 324A are slidably movable toward and away from each other by means of extension and retraction, respectively, of actuator A8 which is mounted beneath table 310 by a pin 360 and a bracket 361. The piston rod 363 of actuator A8 is connected by a linkage, hereinafter described, to the support plates 328 and 328A to effect sliding movement thereof. In particular, this linkage comprises three links 364, 365 and 367 (see FIG. 21). Link 364 is pivotably mounted beneath table 310 on a pivot pin 369. One end of link 364 is pivotably connected by clevis joint 371 to piston rod 363. One end of link 365 is pivotably connected by a pin 373 to T-shaped slidable support plate 328 and its other end is pivotably connected by a pin 375 to link 364 (between pins 369 and 371). One end of link 367 is pivotably connected by a pin 378 to T-shaped support plate 328A and its other end is pivotably connected by a pin 377 to the other end of link 364.

For operation of long-strip attachment mechanism LSM, first assume that stripper blades 87 in cutter/stripper machine CSM are replaced by stripper blades 86A (shown in phantom lines in FIG. 17), which are spaced from cutter blades 85 at a distance D2 which is greater than distance D3 (and could be up to 12 inches long). However, distance D3 still represents the effective stripping limit of the stripper blades 86A during a stripping operation carried out by cutter/stripper machine CSM above. Now assume that the cutter/stripper heads 82 and 83 close, that the cutter blades 85 sever wire segment 64 and that stripper blades 86A and 87 score the insulation on both sides of the cut. Further, assume that movable clamp 67 and the cutter/stripper heads 82 and 83 (i.e., cutter/stripper head mechanism 80) move from their respective start to finish positions to effect complete stripping of portion 14A but only partial stripping of portion 14B. Then, to effect complete stripping of the long scored insulation portion 14B from the trailing end of segment 64, the following procedure is carried out. First, the cutter/stripper heads 82 and 83 are maintained closed and stationary their in finish position. Second, movable clamp 68 is opened to release its grip segment 64. At the same time, actuator A8 is actuated (extended) by controller EC and the rotating wire-gripping belts 312 and 312A are closed. This causes cable segment 64 to be gripped and drawn along path P1 relative to the still-closed cutter/stripper heads 82 and 83 and long portion 14B is completely stripped by the stripper blades 86A, since segment 64 can be moved for a distance greater than distance D2. Third, the wire-gripping belts 312 and 312A are reopened. Thereafter, movable clamp 68 and the cutter/stripper heads 82 and 83 return to their respective start positions in readiness for a repeat of the cycle.

A more detailed description of operation of cutter/stripper machine CSM and long-strip attachment mechanism LSM is as follows:

Make the same initial assumptions as specified hereinbefore in regard to operation of cutter/stripper machine CSM. Also assume that stripper blades 86A replace stripper blades 86 (FIG. 17). Steps (1) through (7) are then carried out as previously described in connection with operation of cutter/stripper machine CSM. Then, the following additional steps (A) through (F) are carried out.

(A) Actuator A2 retracts to open movable clamp 68 but stationary clamp 67 and the cutter/stripper heads 82 and 83 remain closed.

(B) Actuator A8 extends to close the rotating wire-gripping belts 312 and 312A whereby segment 64 is gripped and moves along path P1 and a long portion 14B of insulation is completely stripped from its severed end (see D2 in FIG. 17).

(C) Actuator A8 retracts to open the belts 312 and 312A to release segment 64 after it is fully stripped.

(D) Actuator A4 retracts to open the cutter/stripper heads 82 and 83.

(E) Actuator A5 retracts to return the cutter/stripper heads 82 and 83 and movable clamp 68 to their respective start positions and actuator A6 retracts out of the path of link 159.

(F) Actuator A1 operates to extend guide tube 42.

At this point, the next cycle of operation can commence.

Coiling Mechanism CM

Referring to FIGS. 16, 18, 22, 23 and 24, coiling mechanism CM comprises the two alternately rotatable coil or coiling bowls C and D horizontally spaced apart and located on opposite sides of wire path P1 downstream of cutter/stripper machine CSM (or the long-strip attachment mechanism LSM, if used, as shown in FIG. 22). The coiling mechanism CM further comprises a wire guide assembly 400, including shiftable wire guide 402 which is reciprocably movable between two positions by solenoid-controlled pneumatic actuator A9. Wire guide 402 receives each cut and stripped segment 64 and directs it through one or the other of two wire guide tubes 403 and 404 and into coiling bowls C and D, respectively, wherein the segment is coiled. Such alternate feeding and rotating enables uninterrupted feeding and coiling of the segments 64, and a finished coil, such as 406 in FIG. 24, can be manually removed from one stationary bowl while another coil is still being formed in the other rotating bowl. The bowls C and D are rotatably driven alternately from continuously rotating electric motor 408 by means of the pneumatic actuators A10 and A11 which operate the clutch/drive mechanisms 412 and 412A, respectively.

Coiling mechanism CM comprises a support structure including a bracket 409, a table 410 and a plate 410A. Table 410 is attached to table 310 of mechanism LSM (see FIG. 18). Motor 408 is mounted beneath plate 410A. Coil bowls C and D are mounted above plate 410A. Coil bowls C and D and their clutch/drive mechanisms 412 and 412A, respectively, are identical in construction and mode of operation. Therefore, only bowl C and its clutch/drive mechanism 412 are hereinafter described in detail. Bowl C is generally toroidal in shape, open at its top, and has a circular upper mounting plate 420 rigidly secured at the upper center thereof by screws 421. Bowl C is rotatably mounted on a non-rotatable, axially movable support shaft 423 by means of a bearing assembly 424 which is fixedly secured to upper mounting plate 420 and fixedly connected to the upper end of shaft 423 by a screw 425. Shaft 423 is slidably mounted in a journal 427 which extends through a hole 428 in plate 410A and is rigidly secured to plate 410A. The lower end of shaft 423 is connected by a clevis joint 430 to a piston rod 432 of actuator A10, the housing of which is secured by screws 435 to a mounting bracket 434 which, in turn, is rigidly secured by screws 436 to the underside of plate 410A. Extension and retraction of piston rod 432 effects raising and lowering, respectively, of shaft 432 and bowl C for a short distance, i.e., less than one-half inch.

The clutch/drive mechanism 412 is operable to establish a driving connection between motor 408 and bowl C so that bowl C can be rotated whenever piston rod 432 of actuator A10 is extended. Thus, motor 408 has a motor shaft 440 on which a motor pulley 415 is affixed for rotation therewith. An endless flexible drive belt 442 is reeved around motor pulley 415 and a clutch pulley 443. Clutch pulley 443 is rotatably mounted on journal 427 through which shaft 423 slidably extends. Clutch pulley 443 has a clutch disc 446 (made of high-friction) material) rigidly affixed to its upper side for rotation therewith. Clutch disc 446 is frictionally engageable with the lower side of a circular clutch plate 450 which is mounted by screws 451 on the lower end of a clutch plate support 452. Clutch plate support 452 takes the form of a hollow cylindrical member or tube which has its upper end rigidly secured by screws 453 to upper mounting plate 420 of bowl C. When piston rod 432 of actuator A10 is retracted, shaft 423 (and bowl C) moves downward a short distance from clutch-disengaged position (FIG. 24) to clutch-engaged position (FIG. 23) wherein clutch disc 446 engages clutch plate 450 and motor 408 causes bowl C to rotate. When piston rod 432 of actuator A10 is extended, shaft 423 (and bowl C) moves upward a short distance from clutch-engaged position (FIG. 23) to clutch-disengaged positon (FIG. 24) wherein motor 408 is disconnected from driving engagement with bowl C.

Figure 23:
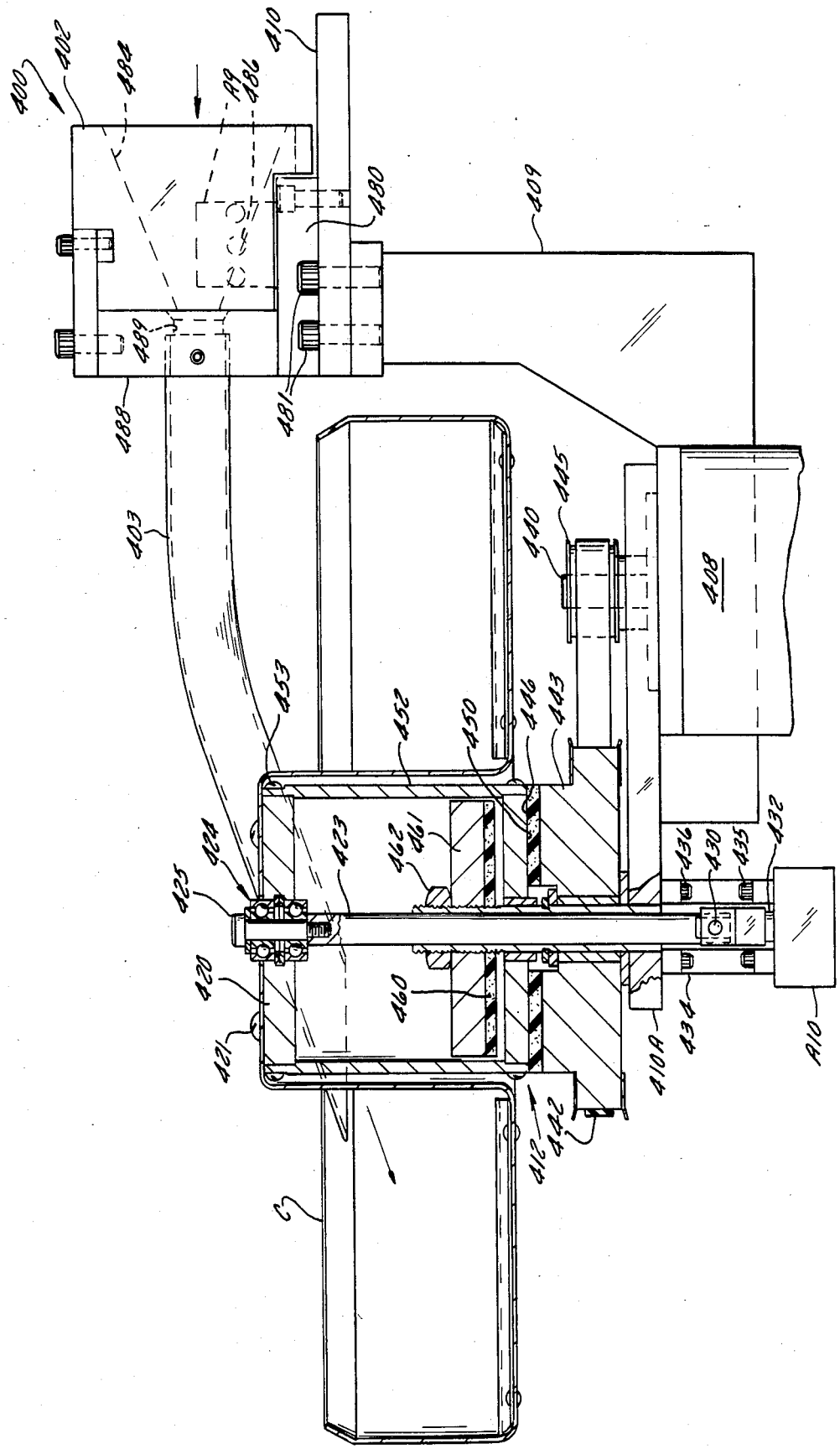
FIG. 23 is a cross-sectional view of a coil bowl taken on line 23—23 of FIG. 24.
Figure 24:
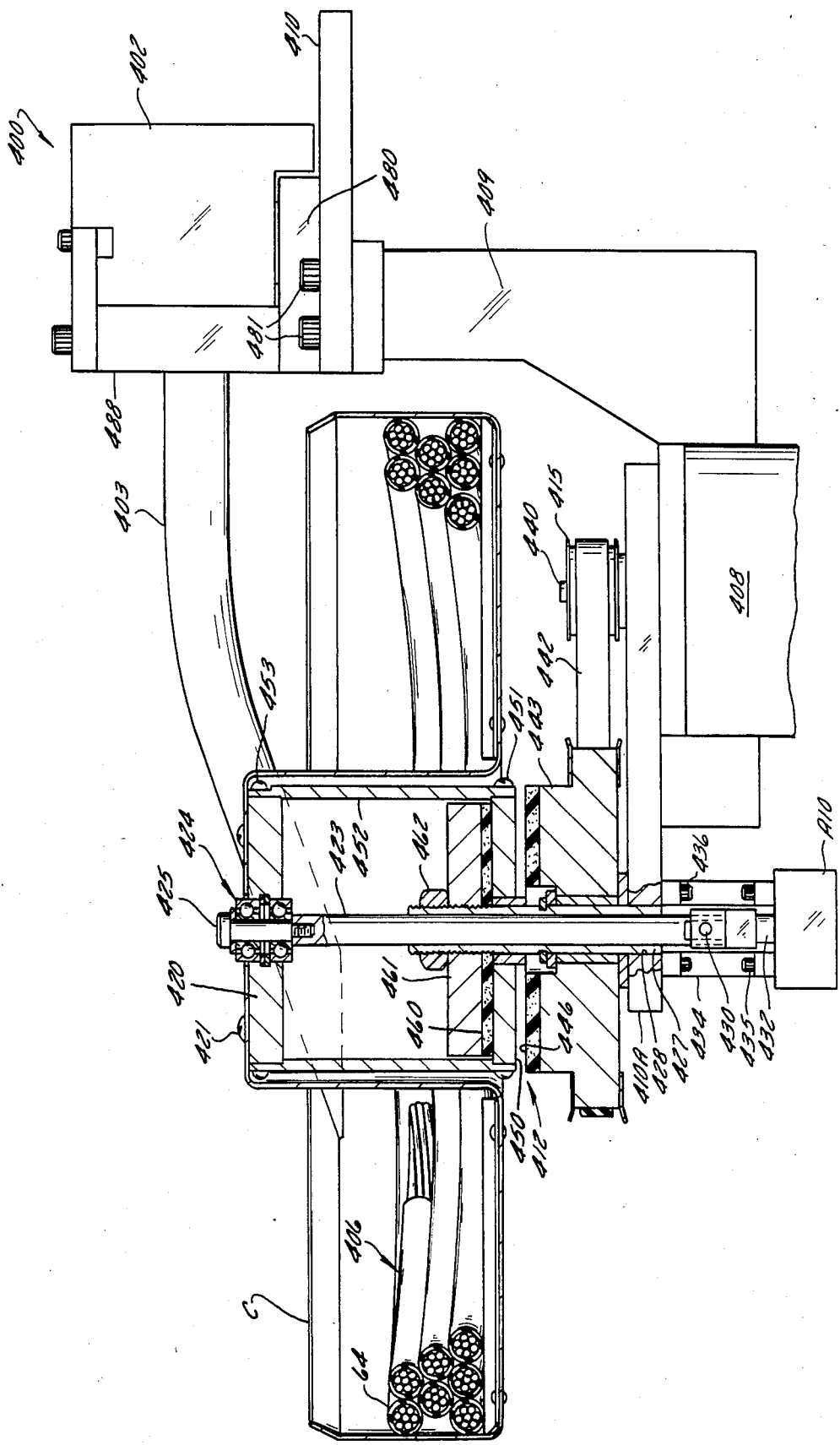
FIG. 24 is a view similar to FIG. 23 but showing a coiled wire segment in the coil bowl.

However, because bowl C with a heavy coil 406 therein would tend to continue rotating for awhile after clutch disengagement because of inertia, brake means are provided to prevent or stop such rotation. The brake means comprise a brake disc 460 (made of high-friction material) which is rigidly affixed to the lower side of a brake disc support 461 which, in turn, is mounted in fixed position on the threaded upper end of journal 427 by means of a nut 462. Comparison of FIGS. 23 and 24 show that, when actuator A10 raises shaft 423 and bowl C, the upper side of clutch plate 450 frictionally engages the lower side of brake disc 460 to stop rotation of bowl C.

Wire guide assembly 400 comprises wire guide 402, which is shiftably movable horizontally by actuator A9, and the pair of stationary wire guide tubes 403 and 404. Wire guide 402 is slidably mounted (for horizontal movement) on a support bracket 480 which is rigidly secured to support structure 409 by screws 481. Wire guide 402 has a funnel-shaped or conically-shaped wire-receiving opening 484 therethrough, with its wider end facing upstream of path P1 and its narrower end facing downstream of path P1. Wire guide 402 is connected to the piston rod 486 of actuator A9 and is movable thereby between two positions (see solid and phantom lines in FIG. 18), but the wider end of opening 484 is always aligned and in registry with path P1. The narrower end of opening 484 is slightly larger in diameter than the diameter of wire segment 64.

Each of the wire guide tubes 403 and 404 has one end rigidly connected to a tube support plate 488 which is rigidly mounted on support bracket 480, and the tubes are aligned with holes 489 and 489A in plate 488. The other ends of the wire guide tubes 403 and 404 extend into the coil bowls C and D, respectively. The smaller end of opening 484 of wire guide 402 aligns with either hole 489 or 489A (and tubes 403 or 404), depending on the shifted position of wire guide 402, so as to direct a wire segment either to bowl C or bowl D.

Operation of wire coiling mechanism CM is as follows. Assume that actuator A9 is extended (by operation of programmable electronic controller EC) and wire guide 402 is in the position shown in FIG. 2 so that opening 484 is aligned with hole 489 in plate 488 and, thus, with guide tube 403 and bowl C. As the leading end of wire segment 64 exits from long-strip mechanism LSM, it enters hole 484 and is directed through guide tube 403. Further, assume that actuator A10 is retracted, that the clutch/drive mechanism 412 for bowl C is engaged, and that bowl C is rotating. Then, as segment 64 is fed into and enters the rotating bowl C, it coils as shown in FIG. 24. When coil 406 is completely formed, programmable electronic controller EC (responding to signals from machine CSM) effects extension of actuator A10 so that bowl C is no longer driven by motor 408 and is braked to a stop so that coil 406 can be manually removed from bowl C. As the next successive wire segment 64 is fed, actuator A9 is retracted so as to shift wire guide 402 into alignment with guide tube 404 and bowl D. At the same time actuator A11 for bowl D is retracted so as to engage the clutch/drive 412A for bowl D so that bowl D can be rotatably driven by motor 408. The wire guide 402 is repeatedly shifted back and forth so that each successive wire segment is directed to alternate coiling bowls and the clutch/drive mechanism 412 and 412A are alternately engaged and disengaged so that the appropriate coil bowl C or D is rotating as a wire segment 64 is fed thereinto. These operations are synchronized with each other by programmable electronic controller EC and, of course, with the operations of cutter/stripper machine CSM and long-strip mechanism LSM.

I claim:

1. Wire processing apparatus comprising:
first means operable to sever a segment from an insulated wire strand and to partially strip a portion of insulation from said segment;
second means operable to releasably grip said segment and to move it relative to said first means to completely strip said portion of insulation therefrom;
and coiling means operable to receive said segment from said second means and to effect coiling thereof.

2. Wire processing apparatus comprising:
first means operable to sever successive segments from an insulated wire strand movable along a path, and to effect partial stripping of a portion of insulation from each of said segments;
second means operable to effect complete stripping of said portions from each of said segments;
and coiling means operable to effect coiling of said segments comprising:
at least two coiling bowls disposed on opposite sides of said path;
and guide means to receive said successive segments and to direct said segments alternately to one coiling bowl or the other coiling bowl, said guide means comprising a wire guide which is reciprocably movable transversely to said path.

3. Wire processing apparatus comprising:
first means operable to sever successive segments from an insulated wire strand and to partially strip a portion of insulation from each of said segments;
second means operable to releasably grip each of said successive segments and to move it relative to said first means to completely strip said portion therefrom;
and coiling means operable to receive said successive segments and to effect coiling thereof, said coiling means comprising:
at least two coiling bowls;
and guide means to receive said successive segments from said second means and to direct said segments alternately to one or the other of said coiling bowls.

4. Apparatus according to claim 3 wherein said successive segments are movable along a path, wherein said two coiling bowls are disposed on opposite sides of said path, and wherein said guide means is reciprocably movable transversely to said path.

5. Wire processing apparatus comprising:
first means, including a clamp and a cutter/stripper head mechanism, operable to sever successive segments from an insulated wire strand and to partially strip a portion of insulation from the trailing end of each of said segments;
second means, including a pair of separable relatively rotatable members, operable to releasably grip each of said successive segments and to move it relative to said cutter/stripper head mechanism to completely strip said portion therefrom;
and coiling means operable to receive said successive segments and to effect coiling thereof, said coiling means comprising:
at least two coiling bowls;
and guide means to receive said successive segments from said second means and to direct said segments alternately to one or the other of said coiling bowls.

6. Apparatus according to claim 5 wherein said successive segments are movable along a path, wherein said two coiling bowls are disposed on opposite sides of said path, and wherein said guide means comprises a wire guide which is reciprocably movable transversely to said path.

7. Wire processing apparatus comprising:
a cutter/stripper machine comprising:
a cutter/stripper head mechanism closeable for severing a segment from said strand and for scoring insulation on the trailing end of said segment;
a movable clamp for releasably gripping said segment and for moving said segment away from said cutter/stripper head mechanism for a predetermined distance to partially strip a portion of insulation from said trailing end of said segment;
and a long-strip mechanism comprising:
a pair of rotatable members for releasably gripping said segment after said movable clamp has released said segment, but while said cutter/stripper head mechanism is closed and engaged with said portion of insulation, for moving said segment further away from said cutter/stripper head mechanism to completely strip said portion of insulation from said trailing end of said segment.

8. Apparatus according to claim 7 wherein said cutter/stripper machine further comprises a stationary clamp for releasably gripping said strand from which said segment is severed, and wherein said cutter/stripper head mechanism also scores insulation on the leading end of said strand and is movable away from said stationary clamp to strip another portion of insulation from said leading end of said strand.

9. Apparatus according to claim 7 or 8 wherein said rotatable members are movable toward and away from each other, and wherein said long-strip mechanism further comprises a motor for rotating said rotatable members, and an actuator to move said rotatable members.

10. Apparatus according to claim 9 wherein said rotatable members are endless flexible belts.

11. A cutter/stripper machine for sheathed cable comprising:
a support;
a cable guide tube mounted on said support and movable between extended and retracted positions;
cable feed means mounted on said support and operable to feed cable through said tube when the latter is extended;
a pair of cable gripping clamps mounted on said support in spaced apart relationship to each other for releasably gripping the exposed cable portion when said tube is retracted, one clamp being movable relative to the other clamp between start and finish positions, each clamp capable of being opened and closed;
a cutter/stripper head mechanism mounted on said support between said clamps for severing a cable segment and for stripping cable sheath therefrom, said cutter/stripper head mechanism being movable relative to said clamps between start and finish positions, said cutter/stripper head mechanism capable of being opened and closed;
means for operating said cable feed means;
actuator means for moving said tube, for moving the movable clamp and for moving said cutter/stripper head mechanism, for opening and closing said clamps, and for opening and closing said cutter/stripper head mechanism;
and control means for said actuator means, said control means comprising sensor means for ascertaining the position of said tube before enabling closure of at least said other clamp.

12. Apparatus according to claim 11 wherein said other clamp is a stationary clamp which is adjustably positionable on said support in accordance with the length of a cable segment to be cut, and wherein said sensor means includes a sensor device which is adjustably positionable relative to said support in accordance with the position of said other clamp in order to establish the retracted position of said tube.

13. Apparatus according to claim 12 wherein said sensor device is connected to and adjustably movable with said other clamp.

14. Apparatus according to claim 11 or 12 or 13 wherein said actuator means comprises a plurality of actuators operated by said control means and including:
a first actuator for moving said tube;
a second actuator for opening and closing said one clamp;
a third actuator for opening and closing said other clamp;
a fourth actuator for opening and closing said cutter/stripper head mechanism; and
a fifth actuator for moving said one clamp and said cutter/stripper head mechanism between their respective start and finish positions.

15. Apparatus according to claim 14 wherein said actuator means further comprises a sixth actuator for assisting said fifth actuator in moving said one clamp and said cutter/stripper head mechanism from their respective start positions.

16. A cutter/stripper machine for sheathed cable comprising:
a support;
a cable guide tube mounted on said support and movable between extended and retracted positions;
a first actuator for moving said tube;
cable feed means mounted on said support and operable to feed cable through said tube when the latter is extended, said cable feed means comprising rotatable separable cable feed wheels and a motor for rotating said feed wheels;
a pair of cable gripping clamps mounted on said support in spaced apart relationship to each other for releasably gripping the portion of cable exposed when said tube is retracted, one clamp being movable relative to the other clamp between start and finish positions, each clamp being capable of being opened and closed;
a second actuator for opening and closing said one clamp;
a third actuator for opening and closing said other clamp;
a cutter/stripper head mechanism mounted on said support between said clamps for severing a cable segment and for sheath stripping, said cutter/stripper head mechanism being movable relative to said clamps between start and finish positions, said cutter/stripper head mechanism capable of being opened and closed;
a fourth actuator for opening and closing said cutter/stripper means;
a linkage on said support and connected between said one movable clamp and said cutter/stripper means and operable to effect differential movement between them as they move from their respective start positions toward their respective finish positions;
a fifth actuator for operating said linkage to effect movement of said one movable clamp and said cutter/stripper head mechanism between their respective start and finish positions;
a sixth actuator engageable with said linkage for assisting said fifth actuator in moving said one clamp and said cutter/stripper head mechanism from their respective start positions;
a selectively operable seventh actuator for selectively closing and separating said feed wheels;
and control means for operating said actuators and comprising: sensor means for ascertaining the position of said tube relative to said other stationary clamp before enabling operation of said actuators, and metering means for ascertaining when a predetermined length of cable has been fed.

17. Apparatus according to claim 16 wherein said sensor means comprises a first sensor for detecting when said cable guide tube is in extended position and a second sensor for detecting when said cable guide tube is in retracted position.

18. Apparatus according to claim 17 wherein said other stationary clamp is adjustably positionable relative to said support, and wherein said second sensor is adjustably positionable relative to said support.

19. Apparatus according to claim 18 wherein said second sensor is mounted on and movable with said stationary other clamp as the latter is adjustably positioned.

20. Apparatus according to claim 16 or 17 or 18 or 19 wherein each actuator operated by said control means is a fluid operated actuator which is controlled by an electric solenoid valve and wherein said control means comprises a programmable electronic controller for operating said solenoid valves.

21. Apparatus according to claim 20 wherein said first sensor and said second sensor are proximity switches responsive to positions of said cable guide tube and provide electric signals to said programmable electronic controller.

22. Apparatus according to claim 21 wherein said metering means comprises a metering roll and a signal generator operated thereby for providing electric signals to said programmable electronic controller.

* * * * *